US012633254B2

(12) United States Patent
Liu

(10) Patent No.: US 12,633,254 B2
(45) Date of Patent: May 19, 2026

(54) SCANNING CONTROL CIRCUIT, DISPLAY MODULE, AND DISPLAY DEVICE

(71) Applicant: GUANGDONG OPPO MOBILE TELECOMMUNICATIONS CORP., LTD., Dongguan (CN)

(72) Inventor: Changyu Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/188,768

(22) Filed: Apr. 24, 2025

(65) Prior Publication Data

US 2025/0252912 A1 Aug. 7, 2025

Related U.S. Application Data

(63) Continuation of application No. PCT/CN2023/122410, filed on Sep. 28, 2023.

(30) Foreign Application Priority Data

Nov. 28, 2022 (CN) ........................ 202211501149.9

(51) Int. Cl.
*G09G 3/3266* (2016.01)
*G09G 3/20* (2006.01)
*G09G 3/32* (2016.01)

(52) U.S. Cl.
CPC ............. *G09G 3/32* (2013.01); *G09G 3/2092* (2013.01); *G09G 2300/0819* (2013.01);
(Continued)

(58) Field of Classification Search
None
See application file for complete search history.

(56) References Cited

U.S. PATENT DOCUMENTS

2017/0025068 A1 1/2017 Jeoung et al.
2018/0005576 A1* 1/2018 Yoon .................... G09G 3/3233
(Continued)

FOREIGN PATENT DOCUMENTS

CN 107680535 A 2/2018
CN 113689825 A 11/2021

OTHER PUBLICATIONS

European Search Report, European Application No. 23896246.8, mailed Sep. 1, 2025 (14 pages).
(Continued)

*Primary Examiner* — Krishna P Neupane
(74) *Attorney, Agent, or Firm* — Ladas & Parry LLP

(57) ABSTRACT

A scanning control circuit is connected to a gate driving module and is connected to at least one P-type transistor in a pixel circuit, and the scanning control circuit is configured to receive both an enable control signal and an initial scanning signal from the gate driving module, and output a target scanning signal to the connected P-type transistor according to the enable control signal and the initial scanning signal. In a case where the enable control signal is in a first level state, a level state of the target scanning signal is the same as that of the initial scanning signal. In a case where the enable control signal is in a second level state, the level state of the target scanning signal is a high level state, and the first level state is different from the second level state.

18 Claims, 13 Drawing Sheets

10

(52) U.S. Cl.
CPC ............... *G09G 2300/0842* (2013.01); *G09G 2300/0861* (2013.01); *G09G 2310/0267* (2013.01); *G09G 2310/08* (2013.01); *G09G 2330/021* (2013.01); *G09G 2340/0435* (2013.01)

(56) References Cited

U.S. PATENT DOCUMENTS

| | | | | |
|---|---|---|---|---|
| 2019/0035322 | A1* | 1/2019 | Kim | H10D 86/60 |
| 2019/0385537 | A1 | 12/2019 | Wang | |
| 2021/0407429 | A1* | 12/2021 | Seo | G09G 3/3266 |
| 2022/0148503 | A1* | 5/2022 | Seo | G09G 3/3233 |

OTHER PUBLICATIONS

International Search Report and Written Opinion, International Application No. PCT/CN2023/122410, mailed Jan. 15, 2024 (15 pages).

* cited by examiner

SCANNING CONTROL CIRCUIT, DISPLAY MODULE, AND DISPLAY DEVICE

CROSS-REFERENCE TO RELATED APPLICATIONS

The present application is a continuation of International Patent Application No. PCT/CN2023/122410, filed on Sep. 28, 2023, which claims priority to Chinese Patent Application No. 202211501149.9, filed on Nov. 28, 2022, which is herein incorporated by reference in its entirety.

TECHNICAL FIELD

The present disclosure relates to the technical field of display technologies, and in particular to a scanning control circuit, a display module, and a display device.

BACKGROUND

With continuous development of technology, people have increasingly high requirements for electronic devices. For example, there are higher requirements for refresh rates of display screens. However, in a case where a high-frequency display is performed on the display screen, the display screen has high power consumption, which greatly affects battery life of a portable electronic device.

SUMMARY OF THE DISCLOSURE

A scanning control circuit configured to be connected to a gate driving module and be connected to at least one first target transistor in a pixel circuit. The scanning control circuit is configured to respectively receive an enable control signal and an initial scanning signal from the gate driving module, and output a target scanning signal to the connected first target transistor based on the enable control signal and the initial scanning signal.

In a case where the enable control signal is in a first level state, a level state of the target scanning signal is the same as that of the initial scanning signal. In a case where the enable control signal is in a second level state, the level state of the target scanning signal is a target level state. The first level state is different from the second level state, and the target level state is a level state that causes the first target transistor to be in an off state.

A display module includes a gate driving module, a first scanning control circuit, and a plurality of pixel circuits.

The gate driving module is configured for generating a first initial scanning signal that is configured for controlling a first target transistor.

The first scanning control circuit includes above scanning control circuit and configured for outputting a first target scanning signal to the connected first target transistor based on a first enable control signal and the first initial scanning signal.

Each of the plurality of pixel circuit includes at least one first target transistor, and at least some first target transistors in the plurality of pixel circuits are connected to the scanning control circuit.

A display device includes above display module and a controller.

The controller is respectively connected to the gate driving module and the first scanning control circuit of the display module, and the controller is configured to drive the gate driving module to generate the first initial scanning signal and generate the first enable control signal.

BRIEF DESCRIPTION OF THE DRAWINGS

In order to more clearly describe the technical solutions in some embodiments of the present disclosure, hereinafter, the accompanying drawings that are used in the description of some embodiments will be briefly described. Obviously, the accompanying drawings in the description below merely show some embodiments of the present disclosure. For those of ordinary skill in the art, other accompanying drawings may be obtained based on these accompanying drawings without any creative efforts.

EXPLANATION OF REFERENCE SIGNS

10: scanning control circuit; 100: first switch module; 200: second switch module; 210: first switch unit; 220: second switch unit; 11: first scanning control circuit; 12: second scanning control circuit; 20: gate driving module; 30: pixel circuit.

DETAILED DESCRIPTION

In order to make the objectives, technical solutions and advantages of the present disclosure clearer, the present disclosure is further described in detail below with reference to the accompanying drawings and embodiments. It should be understood that the specific embodiments described herein are only for explaining the present disclosure and are not intended to limit the present disclosure.

It may be understood that the terms "first", "second", and the like in the present disclosure may be configured to describe various components in the present disclosure, but these components are not limited by these terms. These terms are only configured to distinguish one component from another component. For example, without departing from the scope of the present disclosure, a first level state may be referred to as a second level state, and similarly, the second level state may be referred to as the first level state. The first level state and the second level state are both level states, but they are not the same level state.

In addition, the terms "first" and "second" in the present disclosure are only configured to describe and cannot be understood as indicating or implying relative importance or implicitly indicating the number of technical features indicated. Therefore, features that are defined as "first" and "second" may explicitly or implicitly include at least one of these features. In the description of the present disclosure, "multiple" means at least two, such as two, three, etc., unless otherwise expressly and specifically qualified. In the description of the present disclosure, the meaning of "several" refers to at least one, such as one, two, etc., unless otherwise expressly and specifically qualified.

The embodiments of the present disclosure provide a scanning control circuit. The scanning control circuit is configured to cooperate with a gate driving module of a display module and a display screen, so as to display an image. The display screen includes an active area (AA area) and a non-active area. Multiple pixel circuits and multiple light-emitting elements are disposed in the active area. The multiple pixel circuits are respectively connected to the multiple light-emitting elements, and the pixel circuits are configured to control brightness of the light-emitting elements, so that the multiple pixel circuits can jointly display an image to be displayed.

Figure 1:
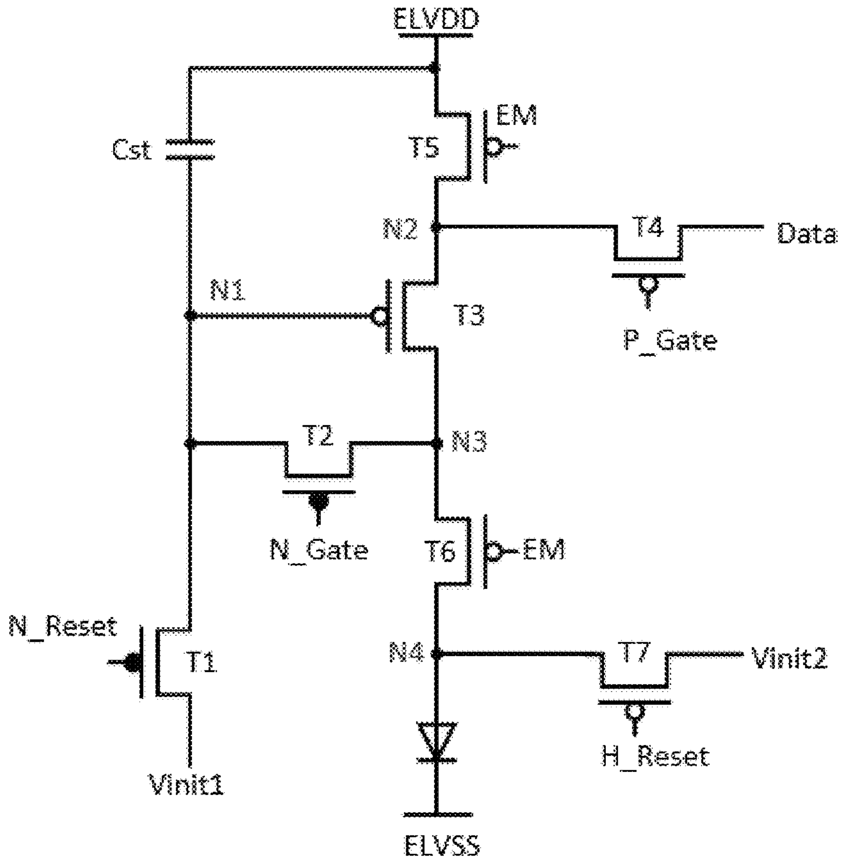
FIG. 1 is a circuit diagram of a pixel circuit of a 7T1C architecture.

FIG. 1 is a circuit diagram of a pixel circuit of a 7T1C architecture. As illustrated in FIG. 1, a pixel circuit of a 7T1C architecture includes 7 transistors and 1 storage capacitor. The driving circuit includes a gate reset unit, an anode reset unit, a data writing unit, a threshold compensation unit, and a light-emitting control unit.

In some embodiments, a transistor T3 may be referred to as a driving transistor, a first terminal of the transistor T3 is configured to receive a data signal Data, and a second terminal of the transistor T3 may output corresponding driving current. A current value of the driving current may be determined by the data signal Data and directly affects the brightness of the light-emitting device. The gate reset unit includes a transistor T1, a first terminal of the transistor T1 is connected to a reset voltage signal Vinit1, and a second terminal of the transistor T1 is connected to a gate of the transistor T3. The transistor T1 is configured to lower a gate voltage of the transistor T3 to a voltage of the reset voltage signal Vinit1 based on a scanning signal received by the gate, so as to reset the gate of the transistor T3. The anode reset unit includes a transistor T7, a first terminal of the transistor T7 is configured to receive a reset voltage signal Vinit2, and a second terminal of the transistor T7 is connected to an anode of the light-emitting device. The transistor T7 is configured to lower an anode voltage of the light-emitting device to a voltage of the reset voltage signal Vinit2 based on the scanning signal received by the gate after the gate of the transistor T3 is reset, so as to reset the anode of the light-emitting device. The voltage of the reset voltage signal Vinit2 may be understood as a starting charging voltage of the anode of the light-emitting device.

The data writing unit includes a transistor T4, a first terminal of the transistor T4 is connected to a data signal line, and a second terminal of the transistor T4 is connected to the first terminal of the transistor T3. The transistor T4 is configured to control on/off of a signal transmission path between the data signal and the first terminal of the transistor T3 based on the scanning signal. The threshold compensation unit includes a transistor T2 and a storage capacitor C1. The storage capacitor C1 is connected to a first voltage terminal ELVDD and the gate of the transistor T3, respectively. A first terminal of the transistor T2 is connected to the second terminal of the transistor T3, and a second terminal of the transistor T2 is connected to the gate of the transistor T3. The transistor T2 is configured to control on/off of a signal transmission path between the gate and the second terminal of the transistor T3 based on the scanning signal, thereby storing a compensation result in the storage capacitor C1. By setting the threshold compensation unit, a threshold voltage of the transistor T3 can be compensated, so as to prevent the threshold voltage of the transistor T3 from affecting the brightness of the light-emitting device. The light-emitting control unit includes a transistor T5 and a transistor T6. A first terminal of the transistor T5 is connected to the first voltage terminal ELVDD, and a second terminal of the transistor T5 is connected to the first terminal of the transistor T3. The transistor T5 is configured to control on/off of a signal transmission path between the first voltage terminal ELVDD and the first terminal of the transistor T3 based on a light-emitting control signal EM. A first terminal of the transistor T6 is connected to the second terminal of the transistor T3, and a second terminal of the transistor T6 is connected to the anode of the light-emitting device. The transistor T6 is configured to control on/off of a signal transmission path between the second terminal of the transistor T3 and the anode of the light-emitting device based on the light-emitting control signal EM.

Figure 2:
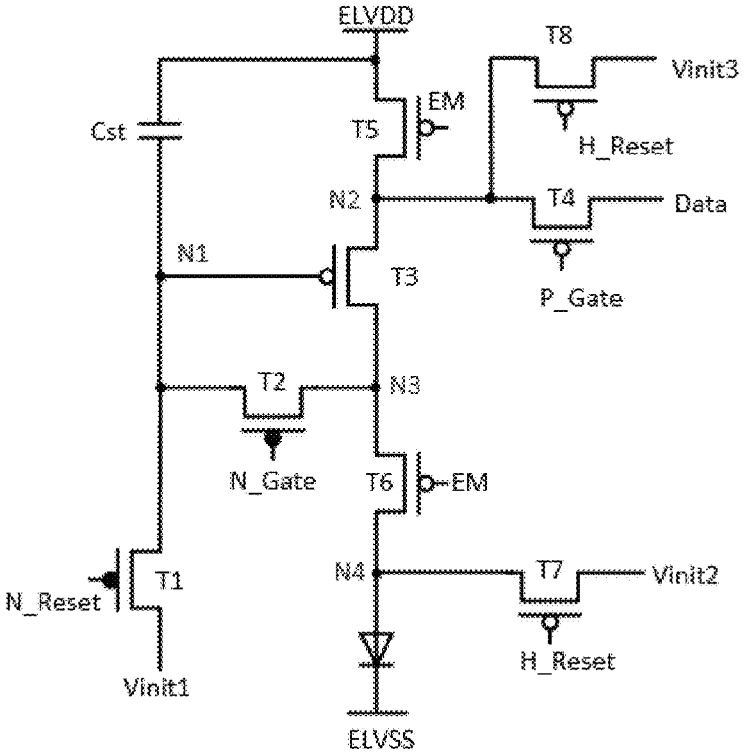
FIG. 2 is a circuit diagram of a pixel circuit of a 8T1C architecture.

It should be noted that each transistor in the pixel circuit may be any one of a P-type transistor and an N-type transistor, and a type of each transistor may not be completely the same. In some embodiments, in a case where the pixel circuit is of a low temperature poly-silicon (LTPS) type, each transistor in the pixel circuit may be the P-type transistor. Based on the driving timing of the pixel circuit, the transistors T2, T4, and T7 may be connected to the same scanning signal, the transistor T1 is connected to another scanning signal, and the transistors T5 and T6 are connected to the light-emitting control signal. In a case where the pixel circuit is of a low temperature polycrystalline oxide (LTPO)

type, some transistors in the pixel circuit may be the N-type transistors. For example, the transistors T1 and T2 of FIG. 1 are the N-type transistors, and the remaining transistors T3-T7 of FIG. 1 are the P-type transistors. Correspondingly, the transistors T2 and T4 need to be connected to different scanning signals. In some embodiments, all transistors in the pixel circuit may also be the N-type transistors. In some embodiments, the pixel circuit may also be other architectures such as 8T1C of FIG. 2, which may not be repeated here. The scanning control circuit of the present embodiment may be applied to any pixel circuit including the P-type transistors.

The gate driving module is configured to generate the scanning signal, so as to control on and off of each transistor in the pixel circuit. The gate driving module may be a gate driven on array (GOA), which can reduce a volume of the display module and lower preparation cost of the display module. In each embodiment of the present disclosure, accompanying drawings are provided with the gate driving module being GOA as an example. In a case where the pixel circuit only includes one type of the transistor, the gate driving module may only include two sets of GOA circuits, and the two sets of GOA circuits are configured to generate the light-emitting control signal and the scanning signal of the transistor, respectively. In a case where the pixel circuit includes both the P-type transistor and the N-type transistor, the gate driving module also needs to include three or five sets of GOA circuits, so as to control on/off states of each transistor respectively, because the P-type transistor conducts in response to a signal of a low-level state and the N-type transistor conducts in response to a signal of a high-level state. The three sets of GOA circuits are configured to generate the light-emitting control signal, the scanning signal for the P-type transistor, and the scanning signal for the N-type transistor, respectively. For the pixel circuits with a more complex architecture, a larger number of GOA circuits, such as five sets, are required. Alternatively, in a case where the gate driving module includes a large number of GOA circuits, multiple sets of GOA circuits may be set on two sides of the display screen, so as to prevent a black edge on a side of the display screen from being too wide. In related arts, in order to reduce power consumption of the display screen, the only option is to adopt an overall frequency reduction mode. However, the overall frequency adjustment strategy is not flexible enough, which affects the user's viewing experience.

Figure 3:
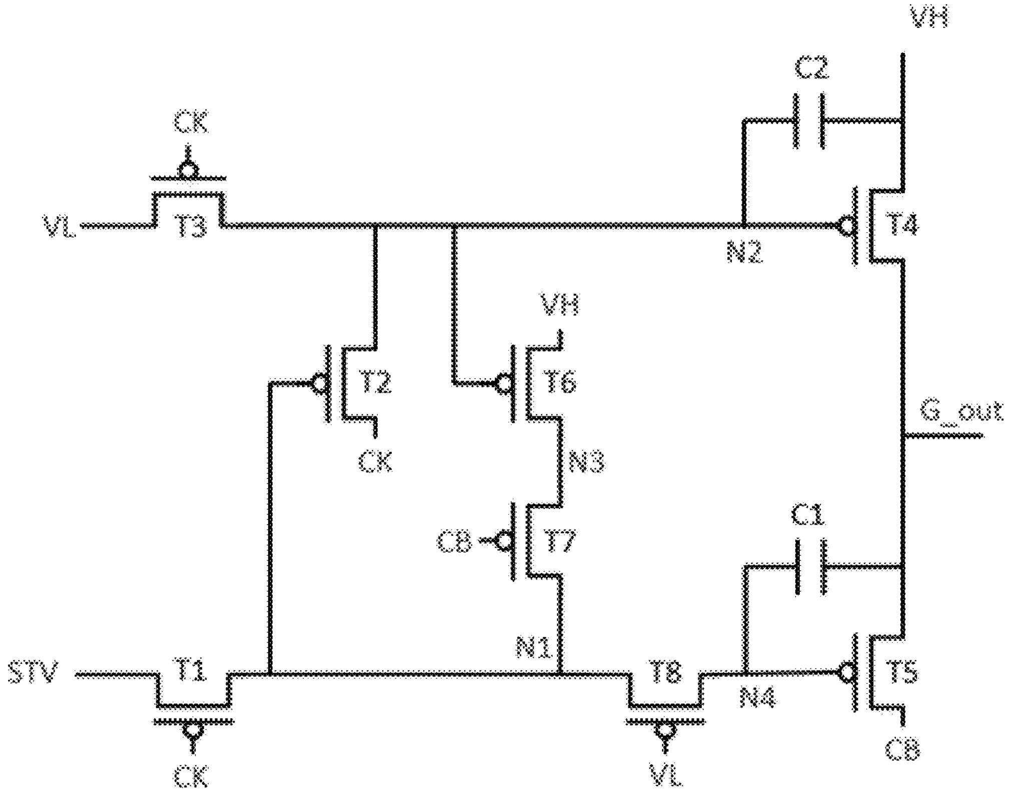
FIG. 3 is a circuit diagram of a GOA (Gate Driven on Array) circuit that is configured to generate scanning signals for P-type transistors.
Figure 4:
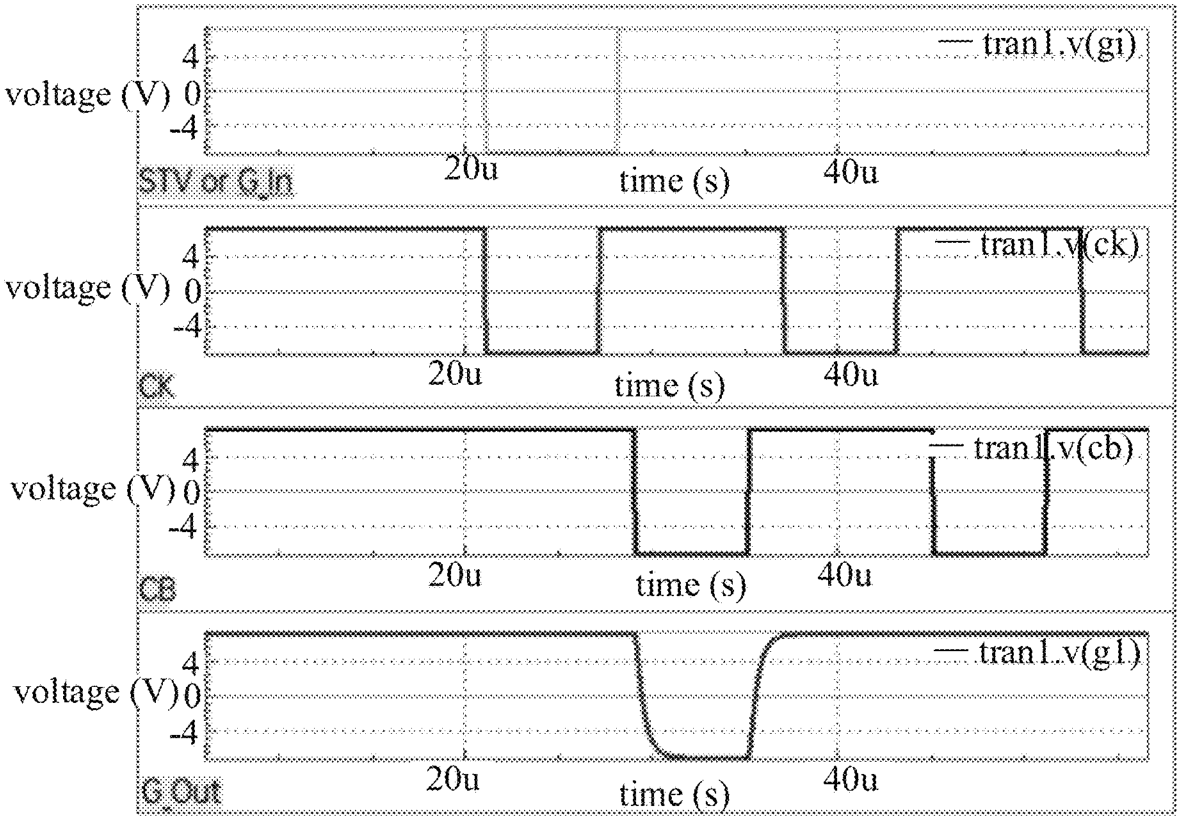
FIG. 4 is a signal timing diagram of the GOA circuit in an embodiment of FIG. 3.
Figure 5:
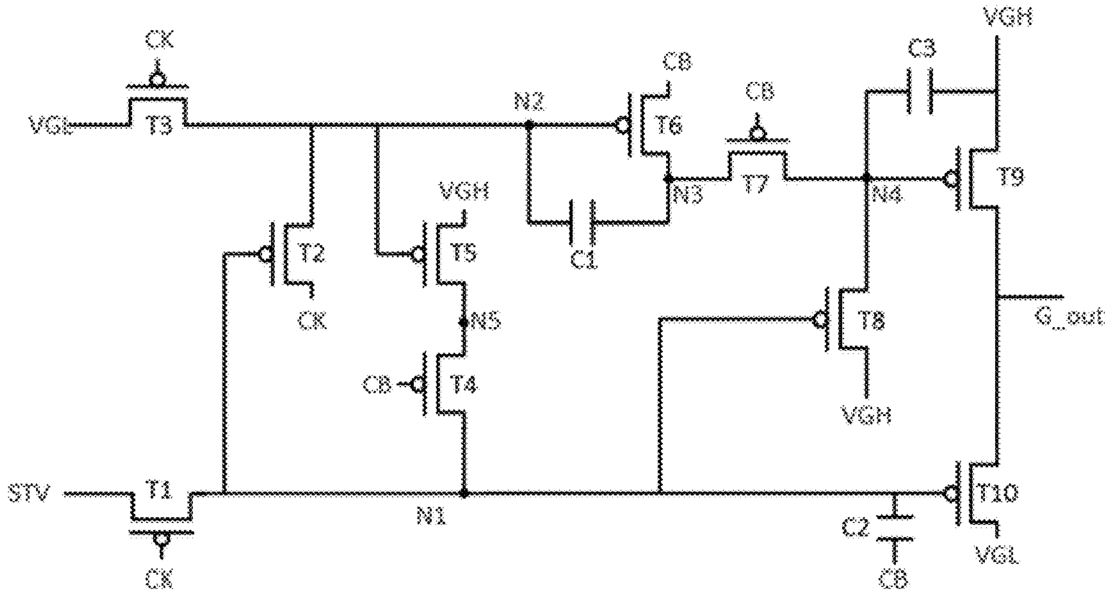
FIG. 5 is a circuit diagram of a GOA circuit that is configured to generate scanning signals for N-type transistors.
Figure 6:
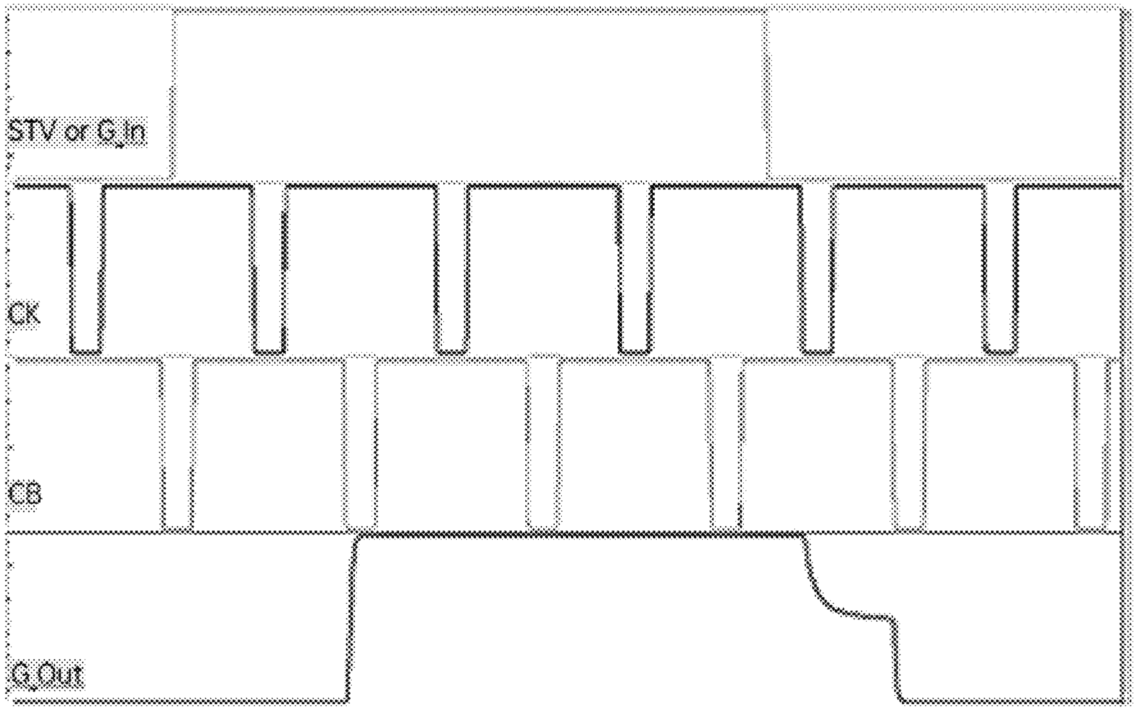
FIG. 6 is a signal timing diagram of the GOA circuit in an embodiment of FIG. 5.

In some embodiments, the circuit diagram of the GOA circuit may be determined based on the type of the scanning signal that is generated for the P-type transistor and the type of the scanning signal that is generated for the N-type transistors as needed. FIG. 3 is a circuit diagram of a GOA circuit that is configured to generate scanning signals for P-type transistors. The circuit of the present embodiment may be referred to as the GOA circuit of the 8T2C architecture. FIG. 4 is a signal timing diagram of the GOA circuit in an embodiment of FIG. 3. As illustrated in FIG. 4, the low-level state of the scanning signal G_out is able to control the conduction of the P-type transistor that receives the scanning signal G_out. FIG. 5 is a circuit diagram of a GOA circuit that is configured to generate scanning signals for N-type transistors. The circuit of the present embodiment may be referred to as the GOA circuit of a 10T3C architecture. FIG. 6 is a signal timing diagram of the GOA circuit in an embodiment of FIG. 5. As illustrated in FIG. 6, the high-level state of the scanning signal G_out is able to control the conduction of the N-type transistor that receives the scanning signal G_out. A STV signal received by the GOA circuit may come from an external controller, and the external controller may include but is not limited to any one of a display driver IC (DDIC) and an application processor (AP).

Figure 7:
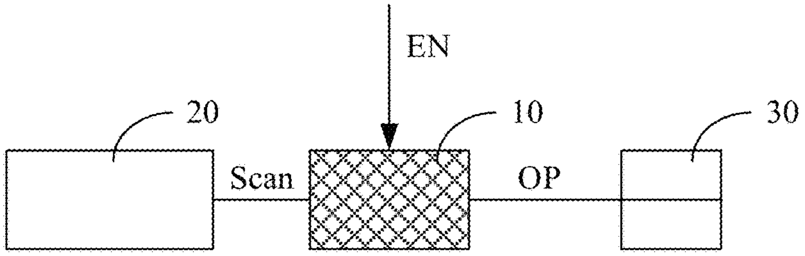
FIG. 7 is a first structural schematic diagram illustrating a connection of a scanning control circuit in one or more embodiments.

Therefore, the present disclosure provides a scanning control circuit 10 that can locally refresh the display screen, so as to reduce the power consumption of the display screen. FIG. 7 is a first structural schematic diagram illustrating a connection of the scanning control circuit 10 in an embodiment. As illustrated in FIG. 7, the scanning control circuit 10 is configured to be connected to a gate driving module 20 and to be connected to at least one first target transistor in a pixel circuit 30. The first target transistor refers to a certain type of the transistor, rather than specifically referring to a transistor in the pixel circuit 30. In some embodiments, the first target transistor may be any one of the P-type transistor and the N-type transistor. In some embodiments, FIG. 7 only shows one scanning control circuit 10, one gate driving module 20 connected to the scanning control circuit 10, and one pixel circuit 30 connected to the scanning control circuit 10. In an actual product, the display module may include multiple gate driving modules 20 and multiple pixel circuits 30. Moreover, in a case where the pixel circuit 30 includes multiple first target transistors, the gate driving module 20 may be connected to any number of the first target transistors. Therefore, in FIG. 7, it is not specifically shown which first target transistor of the gate driving module 20 is connected to the pixel circuit 30. The scanning control circuit 10 is configured to receive an enable control signal EN and an initial scanning signal Scan from the gate driving module 20, respectively, and output a target scanning signal OP to the connected first target transistor based on the enable control signal EN and the initial scanning signal Scan.

In some embodiments, the enable control signal EN may come from a display driver chip, and the display driver chip is a mainstream controller of current display device. In some embodiments, some display driver chips may integrate touch functions and may be referred to as touch and display driver integration (TDDI). In some embodiments, the enable control signal EN may also come from the application processor, and the application processor may also be referred to as an application chip, typically a system on chip (SoC). Based on a high integration characteristic of SoC, the size of the display device can be greatly reduced. Therefore, according to the specific hardware scheme of the display device, an appropriate controller may be selected to generate the enable control signal EN, which is not limited in the present embodiment.

In some embodiments, the enable control signal EN may be understood as a clock signal. In a case where the enable control signal EN is in a first level state, a level state of the target scanning signal OP is the same as that of the initial scanning signal Scan. That is, based on the initial scanning signal Scan with the first level state, the scanning control circuit 10 may generate the target scanning signal OP that may drive the first target transistor to be periodically in an on or off state, so that the pixel circuit 30 receiving the target scanning signal OP may refresh. In a case where the enable control signal EN is in a second level state, the level state of the target scanning signal OP is the target level state, the target level state is the level state that causes the first target transistor to be in an off state. That is, based on the initial scanning signal Scan with the second level state, the scanning control circuit 10 may generate the target scanning signal OP that continues to be in the target level state, so as to control connected first target transistor to remain in the off state, thereby avoiding data refresh in the corresponding pixel circuit 30 and maintaining the data of the previous frame. The first level state and the second level state are different from each other. In some embodiments, the first level state may be a low-level state, and the second level state may be a high-level state; alternatively, the first level state may be the high-level state, and the second level state may be the low-level state. The first level state and the second level state may be determined based on the type of the first target transistor, which is not limited in the present embodiment.

Figure 8:
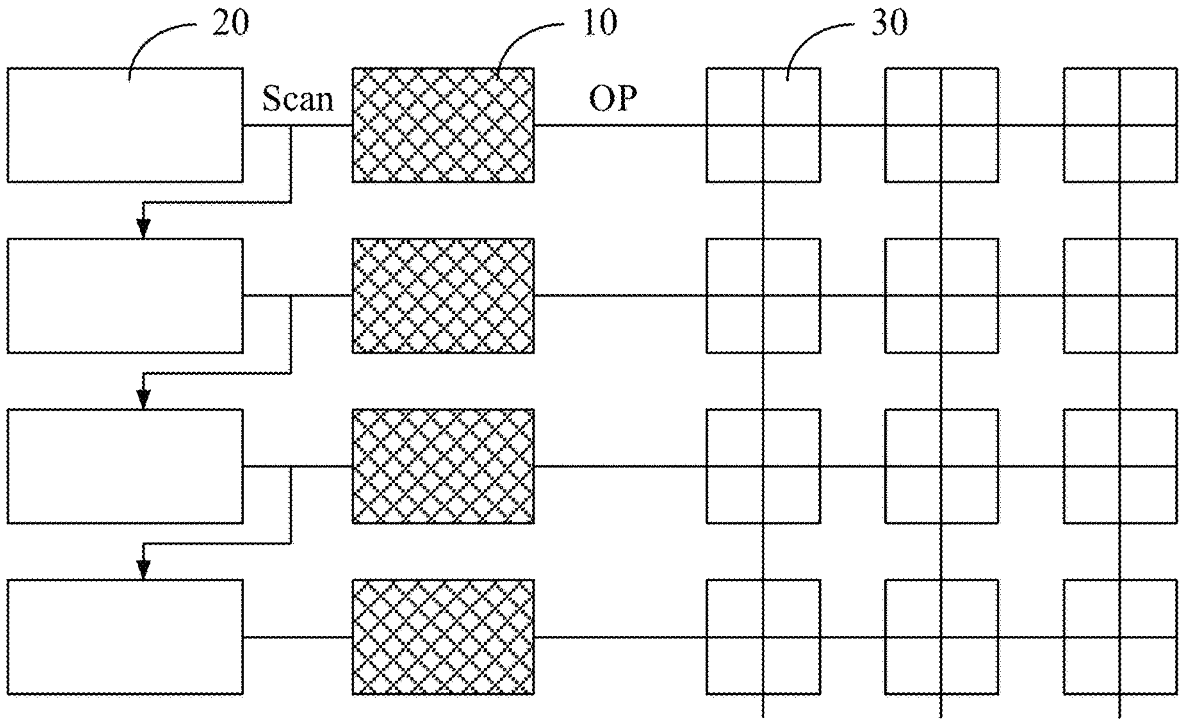
FIG. 8 is a second structural schematic diagram illustrating a connection of the scanning control circuit in one or more embodiments.

Therefore, based on the above structure, it is only necessary to change the level state of the enable control signal EN received by the scanning control circuit 10, the local refresh for the display screen with multiple pixel circuits 30 may be achieved. In some embodiments, FIG. 8 is a second structural schematic diagram illustrating a connection of the scanning control circuit 10 in an embodiment. FIG. 8 shows multiple scanning control circuits 10, corresponding connected multiple gate driving modules 20 and multiple pixel circuits 30. As illustrated in FIG. 8, multiple pixel circuits 30 are arranged in an array, and one scanning control circuit 10 is connected to multiple pixel circuits 30 located in the same row and to one corresponding gate driving module 20. Multiple gate driving modules 20 are sequentially connected in series and transmit the initial scanning signal Scan row-by-row from top to bottom. Therefore, the gate driving module 20 of the previous stage triggers the gate driving module 20 of the next stage, so as to generate the initial scanning signal Scan, so that all gate driving modules 20 output the initial scanning signals Scan in sequence, thereby achieving a row-by-row refresh for the pixel circuit 30 that needs to be refreshed.

Figure 9:
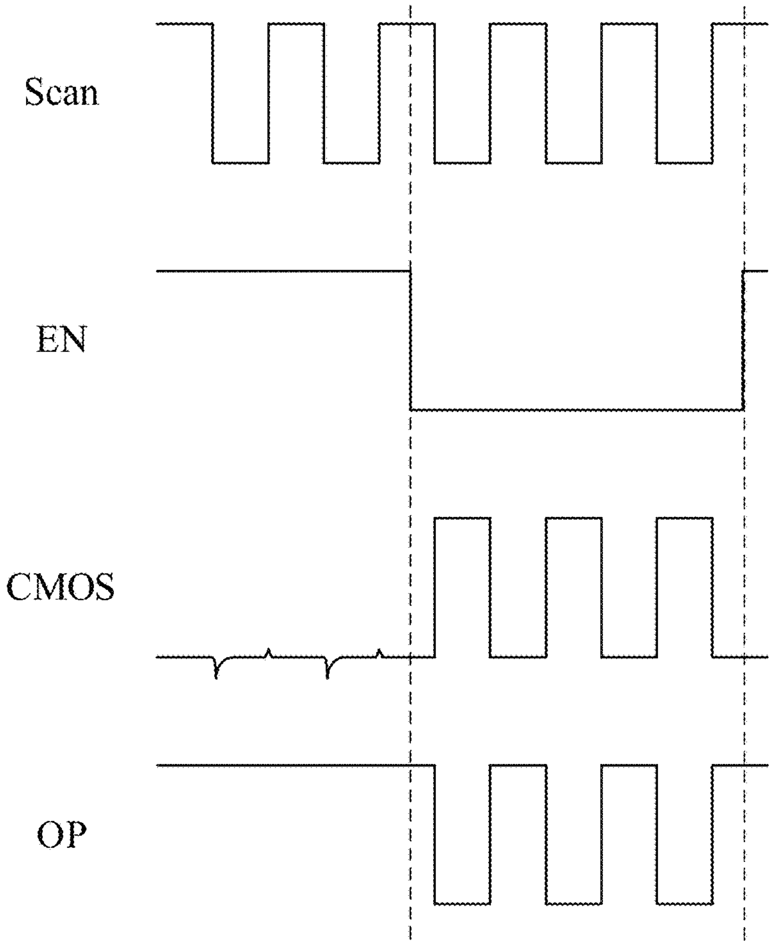
FIG. 9 is a first timing diagram of the scanning control circuit in one or more embodiments.
Figure 10:
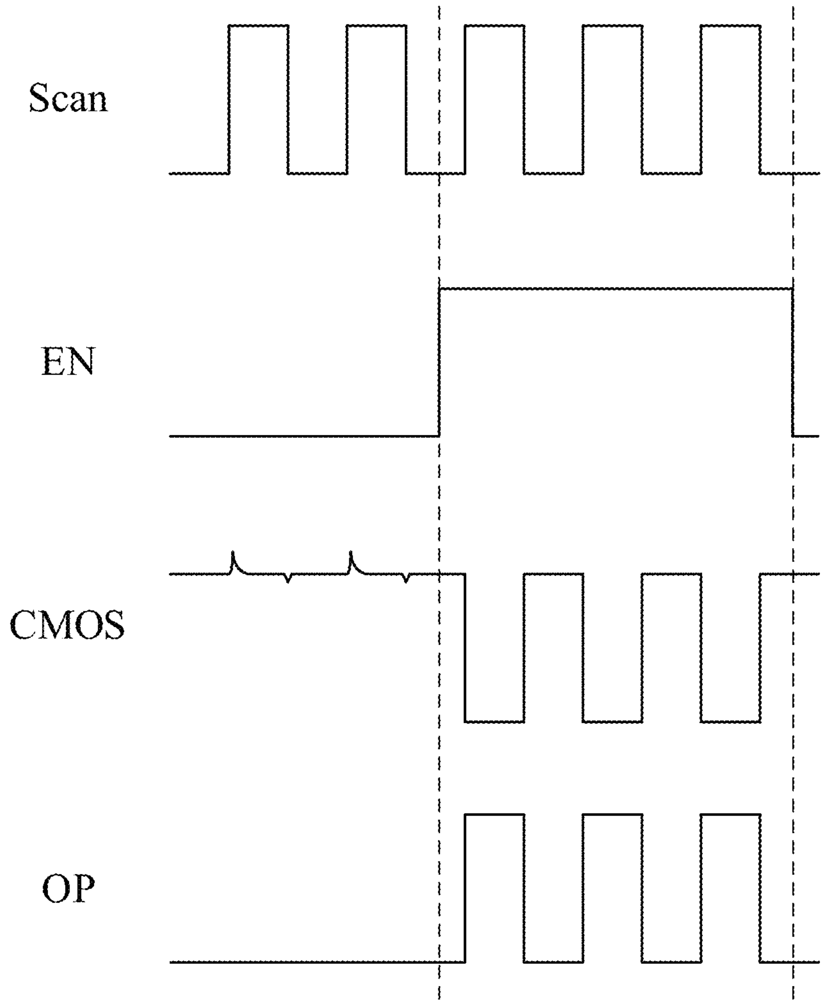
FIG. 10 is a second timing diagram of the scanning control circuit in one or more embodiments.

Taking the first level state being the low-level state as an example, FIG. 9 is a first timing diagram of the scanning control circuit 10 in an embodiment. As illustrated in FIG. 9, the level state of the target scanning signal OP output by the scanning control circuit 10 that receives the enable control signal EN with the low-level state is the same as that of the initial scanning signal Scan, thereby enabling the pixel circuit 30 in the corresponding row to perform data refresh. The level state of the target scanning signal OP output by the scanning control circuit 10 that receives the enable control signal EN with the high-level state is the high-level state, and the pixel circuit 30 in the corresponding row maintains the data unchanged. Taking the first level state being a high-level state as an example, FIG. 10 is a second timing diagram of the scanning control circuit 10 in an embodiment. As illustrated in FIG. 10, the level state of the target scanning signal OP output by the scanning control circuit 10 that receives the enable control signal EN with the high-level state is the same as that of the initial scanning signal Scan, thereby enabling the pixel circuit 30 in the corresponding row to perform data refresh. The level state of the target scanning signal OP output by the scanning control circuit 10 that receives the enable control signal EN with the low-level state is the low-level state, and the pixel circuit 30 in the corresponding row maintains the data unchanged.

Figure 11:
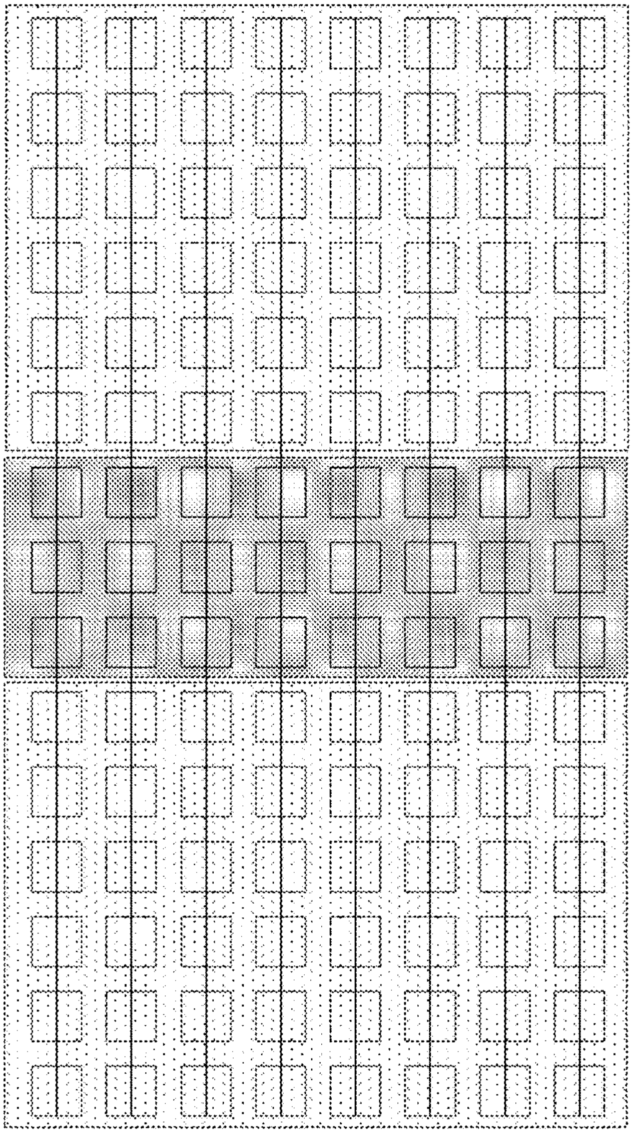
FIG. 11 is a schematic diagram illustrating a refresh area division of a display screen in one or more embodiments.

FIG. 11 is a schematic diagram illustrating a refresh area division of a display screen in an embodiment. As illustrated in FIG. 11, the refresh frequency required for each pixel circuit 30 may be determined respectively based on the display scene. In a case where it is determined that the refresh frequency required for each pixel circuit 30 is the same, each refresh control circuit may be controlled to output the target scanning signal OP with the same waveform as the initial scanning signal Scan, so as to control the display screen to perform global refresh. In a case where it is determined that the refresh frequency required for each pixel circuit 30 is not exactly the same, the display screen may be divided into multiple refresh areas based on the refresh frequency. Each refresh area includes at least one row of pixel circuits 30, and the refresh frequency of two adjacent refresh areas is different from each other. In the embodiment shown in FIG. 11, the display screen may be divided into three refresh areas. The refresh frequency of the pixel circuits 30 located in an upper refresh area is the same as the refresh frequency of the pixel circuits 30 located in a lower refresh area. However, the refresh frequency of the pixel circuits 30 located in the upper refresh area and the lower refresh area is different from that of the pixel circuit 30 located in a middle refresh area. In some embodiments, the refresh area of the pixel circuit 30 located in the middle refresh area may be larger than that of the pixel circuit 30 located in the upper refresh area and the lower refresh area. It can be understood that the above three refresh areas are only for illustrative purposes and are not intended to limit the protection scope of the present embodiment. The display screen may also be divided into other numbers of refresh areas, such as two refresh areas, or four refresh areas, etc. Moreover, in a case where the display screen is divided into three or more refresh areas, the refresh frequency of the pixel circuit 30 in each refresh area may be different, which is not limited in the present embodiment. Therefore, based on the scanning control circuit 10 of the present embodiment, the display screen may be locally refreshed and adaptively reduced in frequency according to the local content of the image to be displayed, making the frequency adjustment strategy more flexible and intelligent. Moreover, the scanning control circuit 10 of the present embodiment may be set according to the transistor type in the pixel circuit 30, thereby avoiding the problem that the pixel circuit 30 is unable to support local refresh caused by mismatched transistor types.

Figure 12:
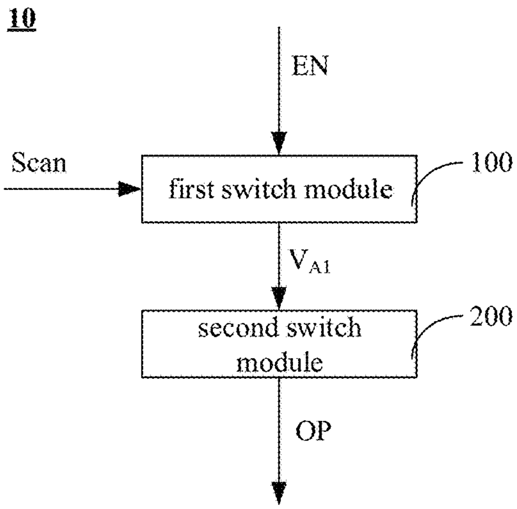
FIG. 12 is a first structural schematic diagram of the scanning control circuit in one or more embodiments.

FIG. 12 is a first structural schematic diagram of the scanning control circuit 10 in an embodiment. As illustrated in FIG. 12, in one embodiment, the scanning control circuit 10 includes a first switch module 100 and a second switch module 200.

In some embodiments, the first switch module 100 is configured to receive the enable control signal EN and generate a first node signal based on the enable control signal EN. The level state of the first node signal $V_{A1}$ is different from that of the enable control signal EN. That is, in a case where the level state of the enable control signal EN is the high-level state, the level state of the first node signal $V_{A1}$ is the low-level state. In a case where the level state of the enable control signal EN is the low-level state, the level state of the first node signal $V_{A1}$ is the high-level state. The second switch module 200 is connected to the first switch module 100, and configured to be connected to the gate driving module 20, and generate the target scanning signal OP based on the initial scanning signal Scan and the first node signal $V_{A1}$. In the present embodiment, the first switch module 100 operates in response to the enable control signal EN, and the second switch module 200 operates in response to the initial scanning signal Scan, so that the scanning control circuit 10 may determine the level state of the target scanning signal OP based on the enable control signal EN and the initial scanning signal Scan, and output the corresponding target scanning signal OP, so as to achieve local refresh for the display screen.

Figure 13:
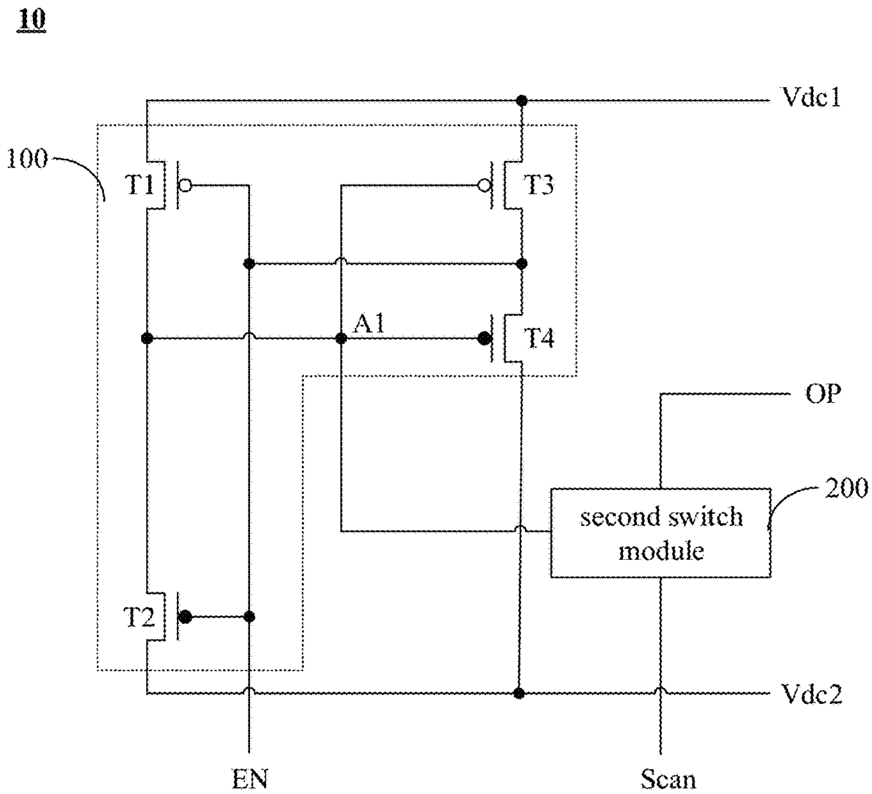
FIG. 13 is a second structural schematic diagram of the scanning control circuit in one or more embodiments.

FIG. 13 is a second structural schematic diagram of the scanning control circuit 10 in an embodiment. As illustrated in FIG. 13, in one embodiment, the first switch module 100 includes a first P-type transistor T1 and a first N-type transistor T2. A first terminal of the first P-type transistor T1 is configured to be connected to a first voltage terminal Vdc1, and the first voltage terminal Vdc1 is configured to transmit signals with the high-level state. A gate of the first P-type transistor T1 is configured to receive the enable control signal EN. A first terminal of the first N-type transistor T2 is connected to a second terminal of the first P-type transistor T1. A second terminal of the first N-type transistor T2 is configured to be connected to a second voltage terminal Vdc2, and the second voltage terminal Vdc2 is configured to transmit signals with the low-level state. A gate of the first N-type transistor T2 is configured to receive the enable control signal EN. The level state of the signals at the first voltage terminal Vdc1 is the high-level state, which means Vdc1>Vth_T1. The level state of the signals at the second voltage terminal Vdc2 is the low-level state, which means Vdc2>Vth_T2. In some embodiments, a connection node between the first P-type transistor T1 and the first N-type transistor T2 is a first node A1 that is configured for outputting the first node signal. That is, in a case where the level state of the enable control signal EN is the low-level state, the first P-type transistor T1 conducts the first node A1 and the first voltage terminal Vdc1, so that the first node signal is in the high-level state. In a case where the level state of the enable control signal EN is the high-level state, the first N-type transistor T2 conducts the first node A1 and the second voltage terminal Vdc2, so that the first node signal is in the low-level state. Therefore, in the present embodiment, by setting the first P-type transistor T1 and the first N-type transistor T2, the level state of the first node signal may be controlled to be different from the level state of the enable control signal EN.

As illustrated in FIG. 13, in one embodiment, the first switch module 100 further includes a second P-type transistor T3 and a second N-type transistor T4. A first terminal of the second P-type transistor T3 is configured to be connected to the first voltage terminal Vdc1, and a gate of the second P-type transistor T3 is connected to the first node A1. A first terminal of the second N-type transistor T4 is connected to a second terminal of the second P-type transistor T3, and a second terminal of the second N-type transistor T4 is configured to be connected to the second voltage terminal Vdc2. A gate of the second N-type transistor T4 is connected to the first node A1. In some embodiments, in a case where the level state of the first node signal is the low-level state, the second P-type transistor T3 conducts the gate of the first N-type transistor T2 and the first voltage terminal Vdc1, so that the gate of the first N-type transistor T2 is in the high-level state, thereby maintaining the conduction of the first N-type transistor T2. In a case where the level state of the first node signal is the high-level state, the second N-type transistor T4 conducts the gate of the first P-type transistor T1 and the second voltage terminal Vdc2, so that the gate of the first P-type transistor T1 is in the low-level state, thereby maintaining the conduction of the first P-type transistor T1. Therefore, in this embodiment, by setting the second P-type transistor T3 and the second N-type transistor T4, positive feedback for the first P-type transistor T1 and the first N-type transistor T2 may be achieved, so as to clamp the voltage of the gate of the first P-type transistor T1 and the voltage of the gate of the first N-type transistor T2, thereby maintaining the conduction state of one of the first P-type transistor T1 and the first N-type transistor T2. By maintaining the above-mentioned conduction state, it is possible to avoid the influence of temperature and other factors in the environment on the level state of the first node signal, which prevents the fluctuation of the level state of the first node signal from causing on/off errors of the second switch module 200, thereby improving stability and reliability of the scanning control circuit 10.

Figure 14:
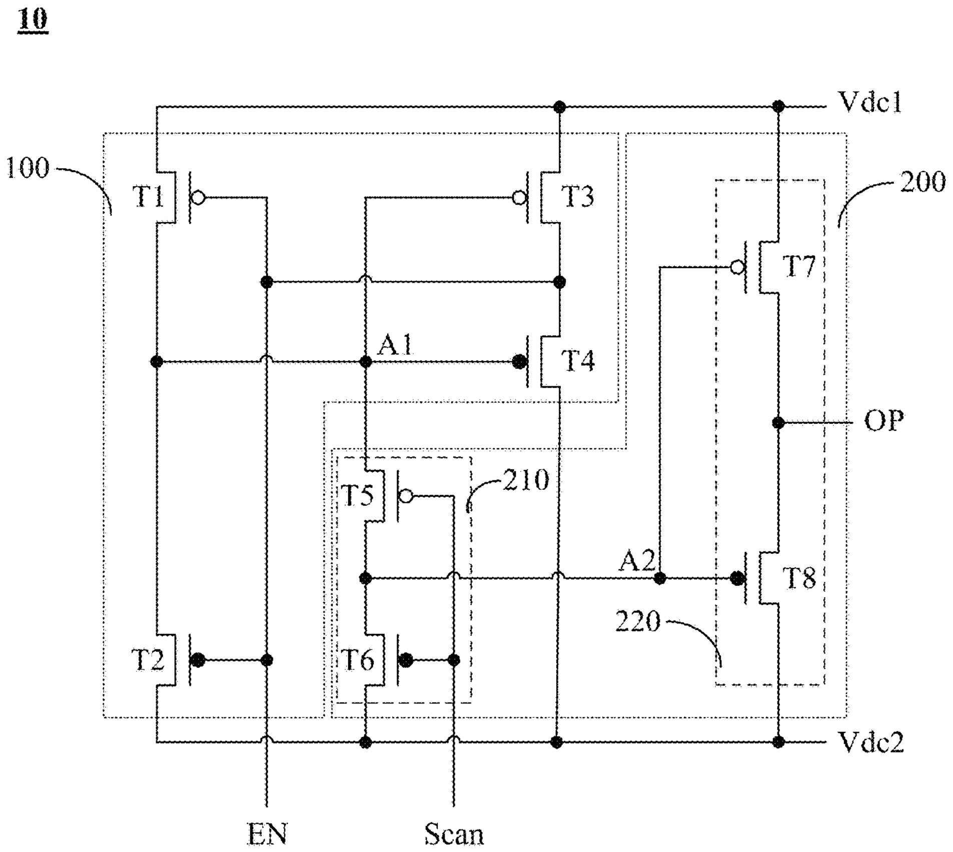
FIG. 14 is a third structural schematic diagram of the scanning control circuit in one or more embodiments.

FIG. 14 is a third structural schematic diagram of the scanning control circuit 10 in an embodiment. As illustrated in FIG. 14, in one embodiment, the type of the first target transistor is P-type, and the target level state is the high-level state. The second switch module 200 is configured to generate the target scanning signal OP with the low-level state in a case where the level state of the first node signal is the high-level state and the level state of the initial scanning signal Scan is the low-level state. Otherwise, the second switch module 200 is configured to generates the target scanning signal OP with the high-level state. In the present embodiment, by coordinating the first node signal and the initial scanning signal Scan, the on/off of the second switch module 200 may be controlled, so as to enable the scanning control circuit 10 to output the desired target scanning signal OP, achieving local refresh for the display screen.

As illustrated in FIG. 14, in one embodiment, the second switch module 200 includes a first switch unit 210 and a second switch unit 220. The first switch unit 210 is connected to the first switch module 100 and configured to be connected to the gate driving module 20. In a case where the level state of the initial scanning signal Scan is the high-level state, the first switch unit 210 generates a second node signal with the low-level state. That is, in a case where the level state of the initial scanning signal Scan is the high-level state, regardless of the level state of the first node signal, the level state of the second node signal is always the low-level state. In a case where the level state of the initial scanning signal Scan is the low-level state, the first switch unit 210 generates the second node signal with the same level state as the first node signal. That is, in a case where the level state of the initial scanning signal Scan and the level state of the first node signal are the low-level state, the level state of the second node signal is also the low-level state. In a case where the level state of the initial scanning signal Scan is the low-level state and the first node signal is the high-level state, the level state of the second node signal is also the high-level state. The second switch unit 220 is connected to the first switch unit 210 and is configured to generate the target scanning signal OP based on the second node signal. The level state of the second node signal is opposite to that of the target scanning signal OP. That is, in a case where the level state of the second node signal is the low-level state, the level state of the target scanning signal OP is the high-level state. The level state of the second node signal is the high-level state, the level state of the target scanning signal OP is the low-level state.

As illustrated in FIG. 14, in one embodiment, the first switch unit 210 includes a third P-type transistor T5 and a third N-type transistor T6. A first terminal of the third P-type transistor T5 is connected to the first node A1, and a gate of the third P-type transistor T5 is configured to receive the initial scanning signal Scan. A first terminal of the third N-type transistor T6 is connected to a second terminal of the third P-type transistor T5. A second terminal of the third N-type transistor T6 is configured to be connected to the second voltage terminal Vdc2, and a gate of the third N-type transistor T6 is configured to receive the initial scanning signal Scan. In some embodiments, a connection node between the third P-type transistor T5 and the third N-type transistor T6 is the second node A2 that is configured for outputting the second node signal. That is, in a case where the level state of the initial scanning signal Scan is the low-level state, the third P-type transistor T5 conducts the first node A1 and the second node A2, so that the level state of the first node signal is the same as the level state of the second node signal. In a case where the level state of the initial scanning signal Scan is the high-level state, the third N-type transistor T6 conducts the second node A2 and the second voltage terminal Vdc2, so that the second node signal is in the low-level state. Therefore, in the present embodiment, by setting the third P-type transistor T5 and the third N-type transistor T6, the level state of the second node signal may be controlled.

As illustrated in FIG. 14, in one embodiment, the second switch unit 220 includes a fourth P-type transistor T7 and a fourth N-type transistor T8. A first terminal of the fourth P-type transistor T7 is configured to be connected to the first voltage terminal Vdc1, and a gate of the fourth P-type transistor T7 is connected to the first switch unit 210. A first terminal of the fourth N-type transistor T8 is connected to a second terminal of the fourth P-type transistor T7, and a second terminal of the fourth N-type transistor T8 is configured to be connected to the second voltage terminal Vdc2. A gate of the fourth N-type transistor T8 is connected to the first switch unit 210. In some embodiments, a connection node between the fourth P-type transistor T7 and the fourth N-type transistor T8 is configured to output the target scanning signal OP. That is, in a case where the level state of the second node signal is the low-level state, the fourth P-type transistor T7 conducts an output node of the target scanning signal OP and the first voltage terminal Vdc1, so that the level state of the target scanning signal OP and the level state of the first voltage terminal Vdc1 are the same. In a case where the level state of the second node signal is the high-level state, the fourth N-type transistor T8 conducts the second node A2 and the second voltage terminal Vdc2, so that the second node signal is in the low-level state. Therefore, in the present embodiment, by setting the fourth P-type transistor T7 and the fourth N-type transistor T8, the level state of the second node signal may be controlled.

FIG. 14 is only one of the feasible embodiments. The first switch module 100 and the second switch module 200 may not adopt a setting method of the embodiment in FIG. 14 at the same time, and the first switch unit 210 and the second switch unit 220 may also not adopt the setting method of the embodiment in FIG. 14 at the same time. As long as the first switch module 100 and the second switch module 200 may meet the aforementioned functions, they are within the protection scope of the present disclosure. In some embodiments, the first switch module 100 may be any inverter circuit capable of inverting signals.

Figure 15:
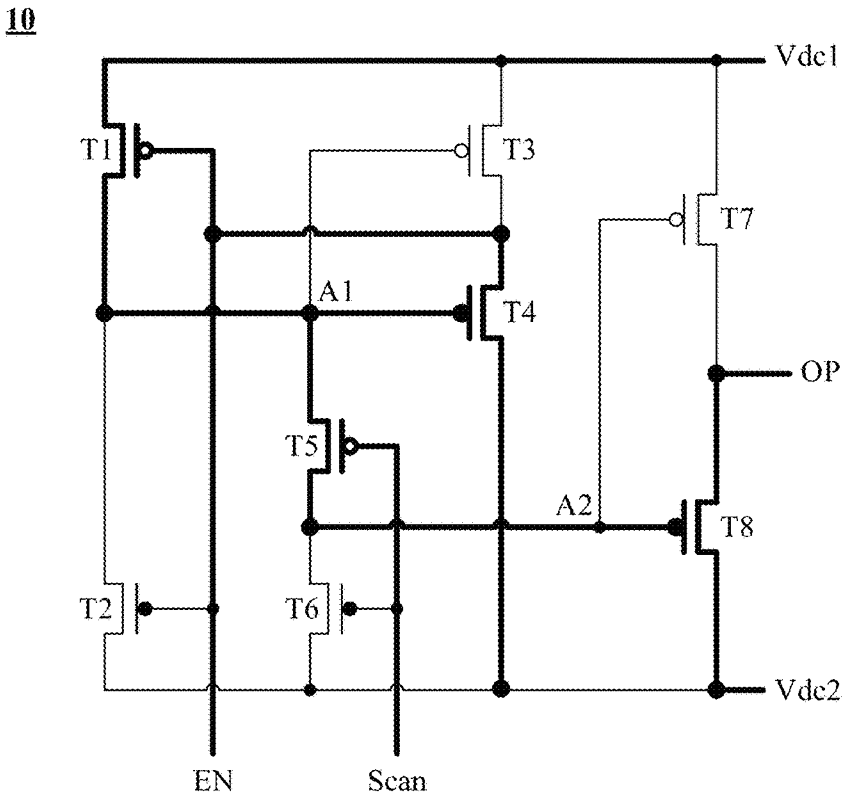
FIG. 15 shows a first operating mode of the scanning control circuit in one or more embodiments of FIG. 14.

Based on the circuit diagram of the scanning control circuit 10 in the embodiment of FIG. 14, the operating mode of the scanning control circuit 10 may be explained in conjunction with FIGS. 15 to 18. In some embodiments, FIG. 15 shows a first operating mode of the scanning control circuit 10 in an embodiment of FIG. 14. As illustrated in FIG. 15, in a case where the level state of the enable control signal EN is the low-level state, the first P-type transistor T1 conducts, thereby pulling the level state of the first node signal to the high-level state of the first voltage terminal Vdc1. In a case where the level state of the initial scanning signal Scan is the low-level state, the third P-type transistor T5 conducts, thereby pulling the level state of the second node signal to the high-level state of the first node signal. The high-level state of the second node signal causes the fourth N-type transistor T8 to conduct, thereby pulling the target scanning signal OP to the low-level state of the second voltage terminal Vdc2.

Figure 16:
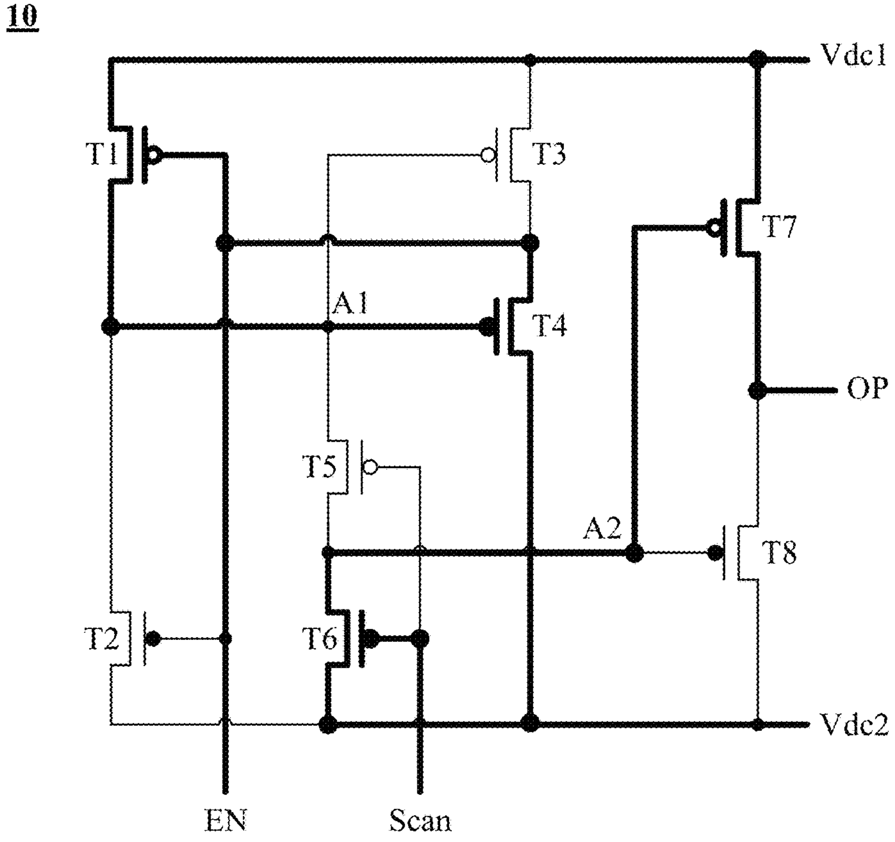
FIG. 16 shows a second operating mode of the scanning control circuit in one or more embodiments of FIG. 14.

FIG. 16 shows a second operating mode of the scanning control circuit 10 in an embodiment of FIG. 14. As illustrated in FIG. 16, in a case where the level state of the enable control signal EN is the low-level state, the first P-type transistor T1 conducts, thereby pulling the level state of the first node signal to the high-level state of the first voltage terminal Vdc1. In a case where the level state of the initial scanning signal Scan is the high-level state, the third N-type transistor T6 conducts, thereby pulling the level state of the second node signal to the low-level state of the second voltage terminal Vdc2. The low-level state of the second node signal causes the fourth P-type transistor T7 to conduct, thereby pulling the target scanning signal OP to the high-level state of the first voltage terminal Vdc1.

Figure 17:
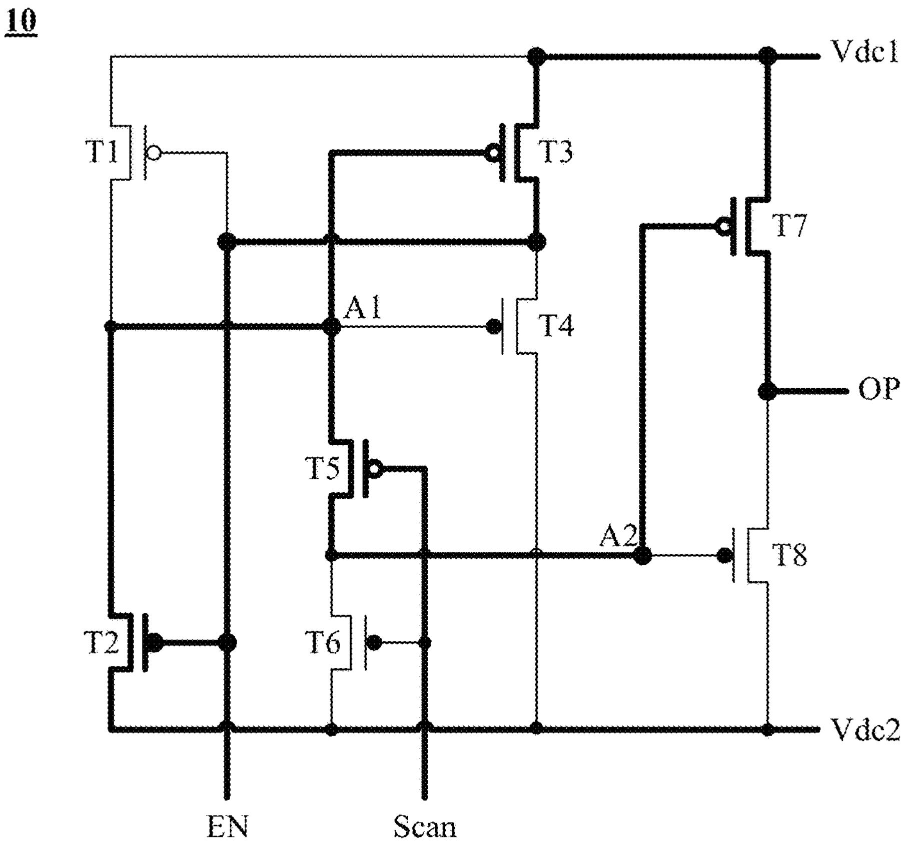
FIG. 17 shows a third operating mode of the scanning control circuit in one or more embodiments of FIG. 14.

FIG. 17 shows a third operating mode of the scanning control circuit 10 in an embodiment of FIG. 14. As illustrated in FIG. 17, in a case where the level state of the enable control signal EN is the high-level state, the second N-type transistor T2 conducts, thereby pulling the level state of the first node signal to the low-level state of the second voltage terminal Vdc2. In a case where the level state of the initial scanning signal Scan is the low-level state, the third P-type transistor T5 conducts, thereby pulling the level state of the second node signal to the low-level state of the first node signal. The low-level state of the second node signal causes the fourth P-type transistor T7 to conduct, thereby pulling the target scanning signal OP to the high-level state of the first voltage terminal Vdc1.

Figure 18:
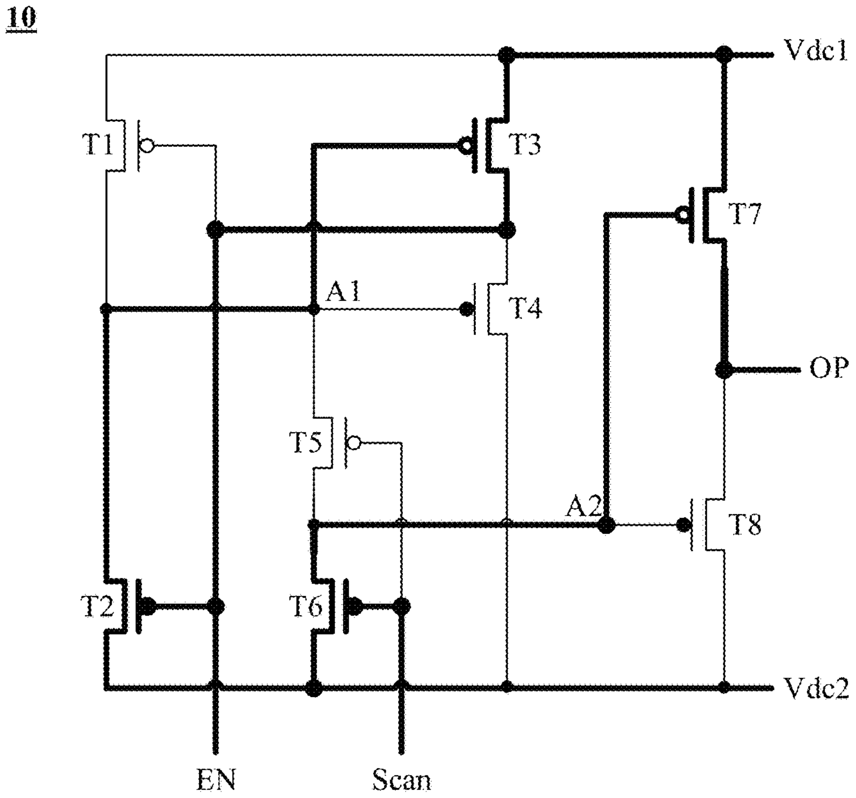
FIG. 18 shows a fourth operating mode of the scanning control circuit in one or more embodiments of FIG. 14.

FIG. 18 shows a fourth operating mode of the scanning control circuit 10 in an embodiment of FIG. 14. As illustrated in FIG. 18, in a case where the level state of the enable control signal EN is the high-level state, the second N-type transistor T2 conducts, thereby pulling the level state of the first node signal to the low-level state of the second voltage terminal Vdc2. In a case where the level state of the initial scanning signal Scan is the high-level state, the third N-type transistor T6 conducts, thereby pulling the level state of the second node signal to the low-level state of the second voltage terminal Vdc2. The low-level state of the second node signal causes the fourth P-type transistor T7 to conduct, thereby pulling the target scanning signal OP to the high-level state of the first voltage terminal Vdc1.

Figure 19:
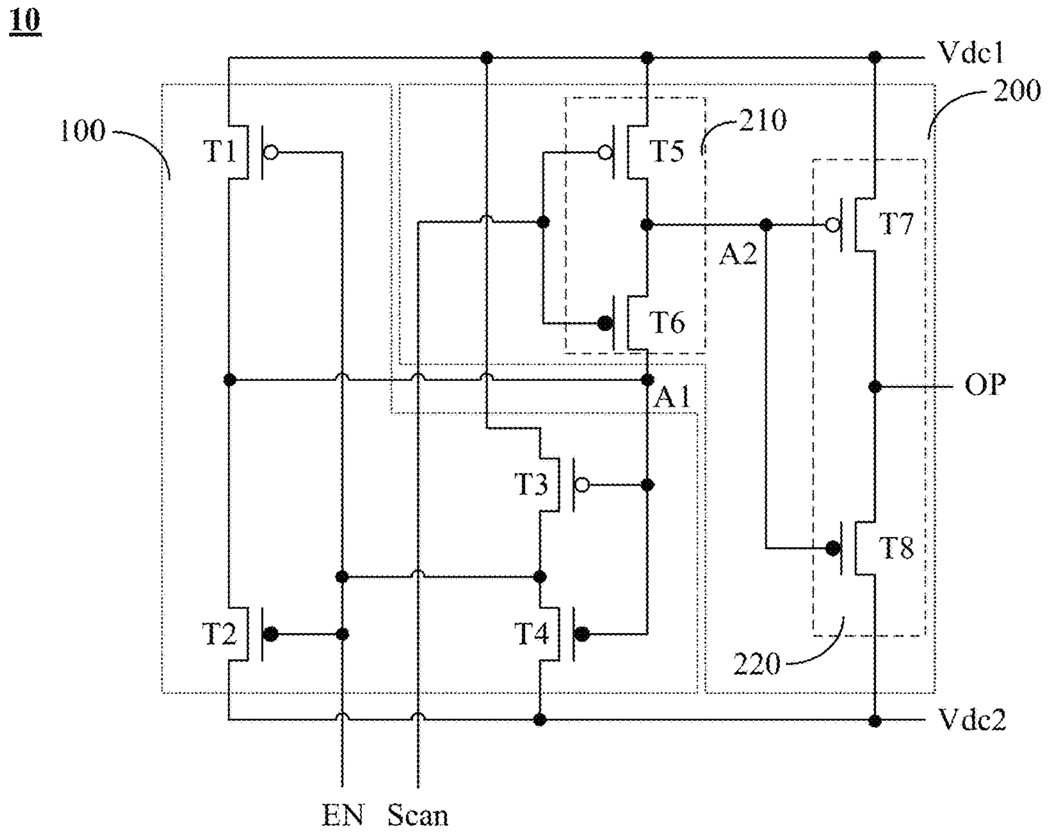
FIG. 19 is a fourth structural schematic diagram of the scanning control circuit in one or more embodiments.

FIG. 19 is a fourth structural schematic diagram of the scanning control circuit 10 in an embodiment. As illustrated in FIG. 19, in one embodiment, the type of the first target transistor is N-type, and the target level state is the low-level state. The second switch module 200 includes the first switch unit 210 and the second switch unit 220. The first switch unit 210 is connected to the first switch module 100 and configured for being connected to the gate driving module 20. In a case where the level state of the initial scanning signal Scan is the low-level state, the first switch unit 210 generates the second node signal with the high-level state. That is, in a case where level state of the initial scanning signal Scan is the low-level state, regardless of the level state of the first node signal, the level state of the second node signal is always the high-level state. In a case where the level state of the initial scanning signal Scan is the high-level state, the first switch unit 210 generates the second node signal with the same level state as the first node signal. That is, in a case where the level state of the initial scanning signal Scan and the level state of the first node signal are the high-level states, the level state of the second node signal is also the high-level state. In a case where the level state of the initial scanning signal Scan is the high-level state and the level state of the first node signal is the low-level state, the level state of the second node signal is also the low-level state. The second switch unit 220 is connected to the first switch unit 210 and configured to generate the target scanning signal OP based on the second node signal. The level state of the second node signal is opposite to that of the target scanning signal OP. That is, in a case where the level state of the second node signal is the low-level state, the level state of the target scanning signal OP is the high-level state. In a case where the level state of the second node signal is the high-level state, the level state of the target scanning signal OP is the low-level state.

As illustrated in FIG. 19, in one embodiment, the first switch unit 210 includes the third P-type transistor T5 and the third N-type transistor T6. The first terminal of the third P-type transistor T5 is configured to be connected to the first voltage terminal Vdc1, and the gate of the third P-type transistor T5 is configured to receive the initial scanning signal Scan. The first terminal of the third N-type transistor T6 is connected to the second terminal of the third P-type transistor T5, and the second terminal of the third N-type transistor T6 is connected to the first node A1. The gate of the third N-type transistor T6 is configured to receive the initial scanning signal Scan. In some embodiments, the connection node between the third P-type transistor T5 and the third N-type transistor T6 is the second node A2 that is configured for outputting the second node signal. That is, in a case where the level state of the initial scanning signal Scan is the high-level state, the third N-type transistor T6 conducts the first node A1 and the second node A2, so that the level state of the first node signal is the same as the level state of the second node signal. In a case where the level state of the initial scanning signal Scan is the low-level state, the third P-type transistor T5 conducts the second node A2 and the first voltage terminal Vdc1, so that the level state of the second node signal is the high-level state. Therefore, in the present embodiment, by setting the third P-type transistor T5 and the third N-type transistor T6, the level state of the second node signal may be controlled.

As illustrated in FIG. 19, in one embodiment, the second switch unit 220 includes the fourth P-type transistor T7 and the fourth N-type transistor T8. The first terminal of the fourth P-type transistor T7 is configured to be connected to the first voltage terminal Vdc1, and the gate of the fourth P-type transistor T7 is connected to the first switch unit 210. The first terminal of the fourth N-type transistor T8 is connected to the second terminal of the fourth P-type transistor T7, and the second terminal of the fourth N-type transistor T8 is configured to be connected to the second voltage terminal Vdc2. The gate of the fourth N-type transistor T8 is connected to the first switch unit 210. In some embodiments, the connection node between the fourth P-type transistor T7 and the fourth N-type transistor T8 is configured to output the target scanning signal OP. That is, in a case where the level state of the second node signal is the low-level state, the fourth P-type transistor T7 conducts the output node of the target scanning signal OP and the first voltage terminal Vdc1, so that the level state of the target scanning signal OP is the same as the level state of the first voltage terminal Vdc1. In a case where the level state of the second node signal is the high-level state, the fourth N-type transistor T8 conducts the second node A2 and the second voltage terminal Vdc2, so that the second node signal is the low-level state. Therefore, in the present embodiment, by setting the fourth P-type transistor T7 and the fourth N-type transistor T8, the level state of the second node signal may be controlled.

FIG. 19 is only one of the feasible embodiments. The first switch module 100 and the second switch module 200 may not adopt the setting mode of the embodiment in FIG. 19 at the same time. The first switch unit 210 and the second switch unit 220 may also not adopt the setting mode of the embodiment in FIG. 19 at the same time. As long as the first switch module 100 and the second switch module 200 may meet the aforementioned functions, they are within the protection scope of the present disclosure. In some embodiments, the first switch module 100 may be any inverter circuit capable of inverting signals.

Figure 20:
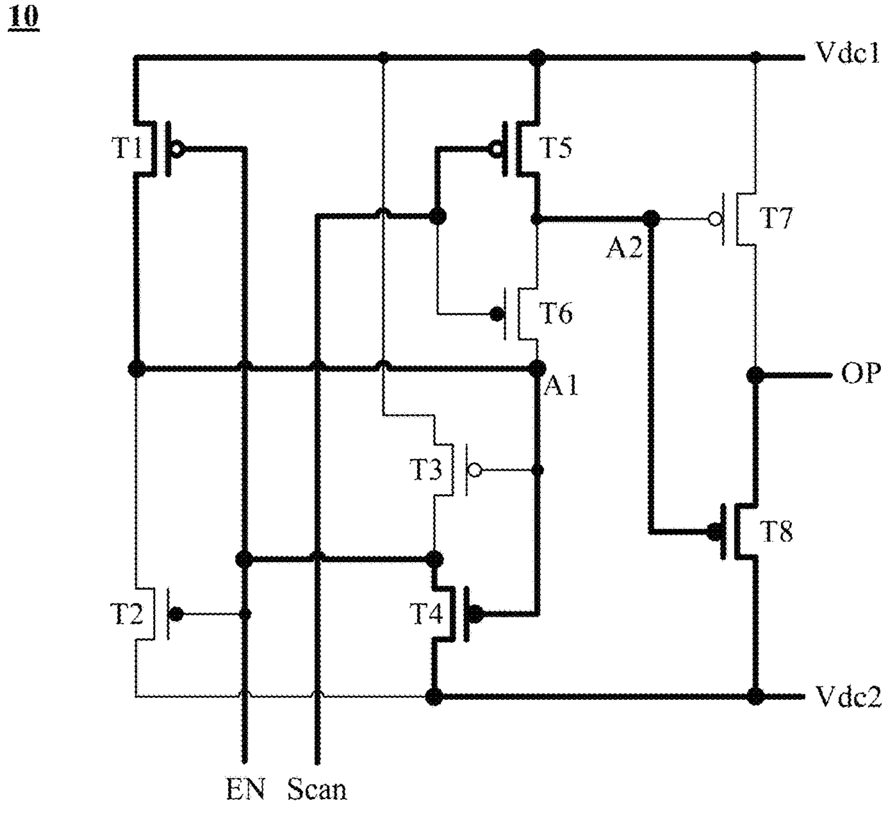
FIG. 20 shows a first operating mode of the scanning control circuit in one or more embodiments of FIG. 19.

Based on the circuit diagram of the scanning control circuit 10 in the embodiment of FIG. 19, the operating mode of the scanning control circuit 10 may be explained in conjunction with FIGS. 20 to 23. In some embodiments, FIG. 20 shows a first operating mode of the scanning control circuit 10 in an embodiment of FIG. 19. As illustrated in FIG. 20, in a case where the level state of the enable control signal EN is the low-level state, the transistor T1 conducts, thereby pulling the level state of the first node signal to the high-level state of the first voltage terminal Vdc1. In a case where the level state of the initial scanning signal Scan is the low-level state, the third P-type transistor T5 conducts, thereby pulling the level state of the second node signal to the high-level state of the first voltage terminal Vdc1. The high-level state of the second node signal causes the fourth N-type transistor T8 to conduct, thereby pulling the target scanning signal OP to the low-level state of the second voltage terminal Vdc2.

Figure 21:
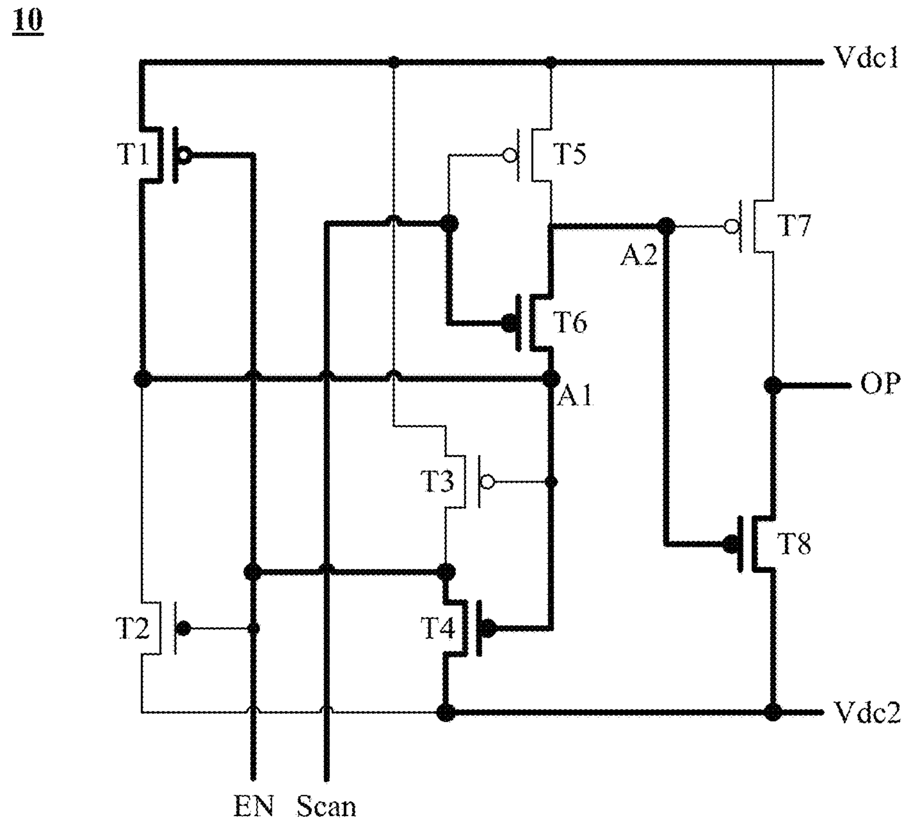
FIG. 21 shows a second operating mode of the scanning control circuit in one or more embodiments of FIG. 19.

FIG. 21 shows a second operating mode of the scanning control circuit 10 in an embodiment of FIG. 19. As illustrated in FIG. 21, in a case where the level state of the enable control signal EN is the low-level state, the transistor T1 conducts, thereby pulling the level state of the first node signal to the high-level state of the first voltage terminal Vdc1. In a case where the level state of the initial scanning signal Scan is the high-level state, the third N-type transistor T6 conducts, thereby pulling the level state of the second node signal to the high-level state of the first node signal. The high-level state of the second node signal causes the fourth N-type transistor T8 to conduct, thereby pulling the target scanning signal OP to the low-level state of the second voltage terminal Vdc2.

Figure 22:
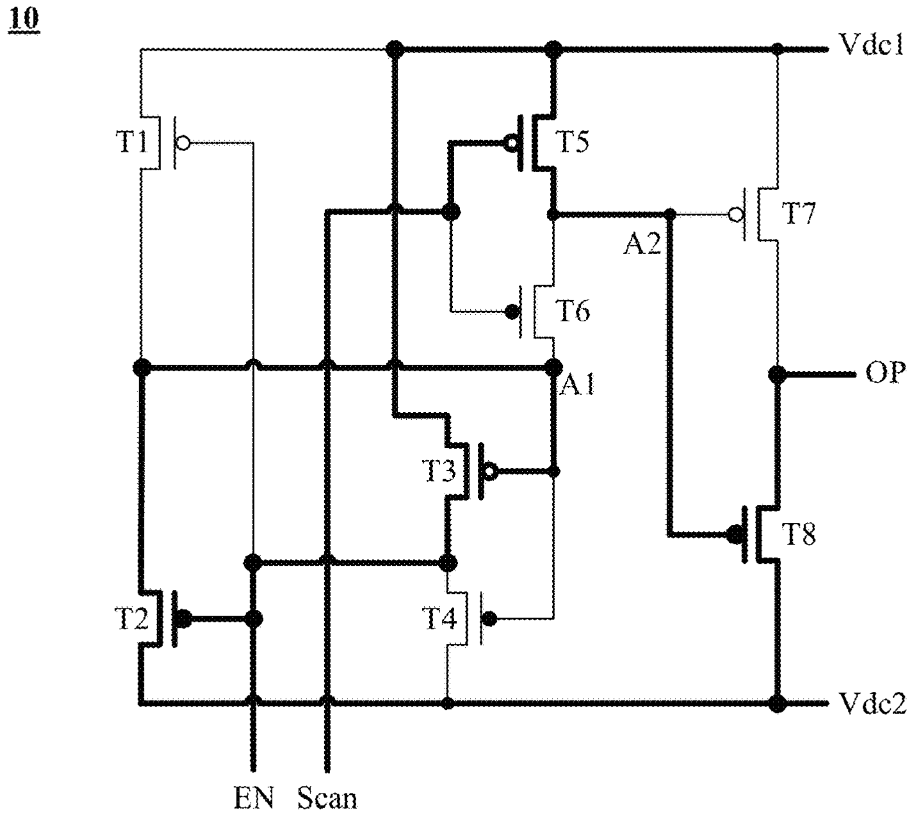
FIG. 22 shows a third operating mode of the scanning control circuit in one or more embodiments of FIG. 19.

FIG. 22 shows a third operating mode of the scanning control circuit 10 in an embodiment of FIG. 19. As illustrated in FIG. 22, in a case where the level state of the enable control signal EN is the high-level state, the first N-type transistor T2 conducts, thereby pulling the level state of the first node signal to the low-level state of the second voltage terminal Vdc2. In a case where the level state of the initial scanning signal Scan is the low-level state, the third P-type transistor T5 conducts, thereby pulling the level state of the second node signal to the high-level state of the first voltage terminal Vdc1. The high-level state of the second node signal causes the fourth N-type transistor T8 to conduct, thereby pulling the target scanning signal OP to the low-level state of the second voltage terminal Vdc2.

Figure 23:
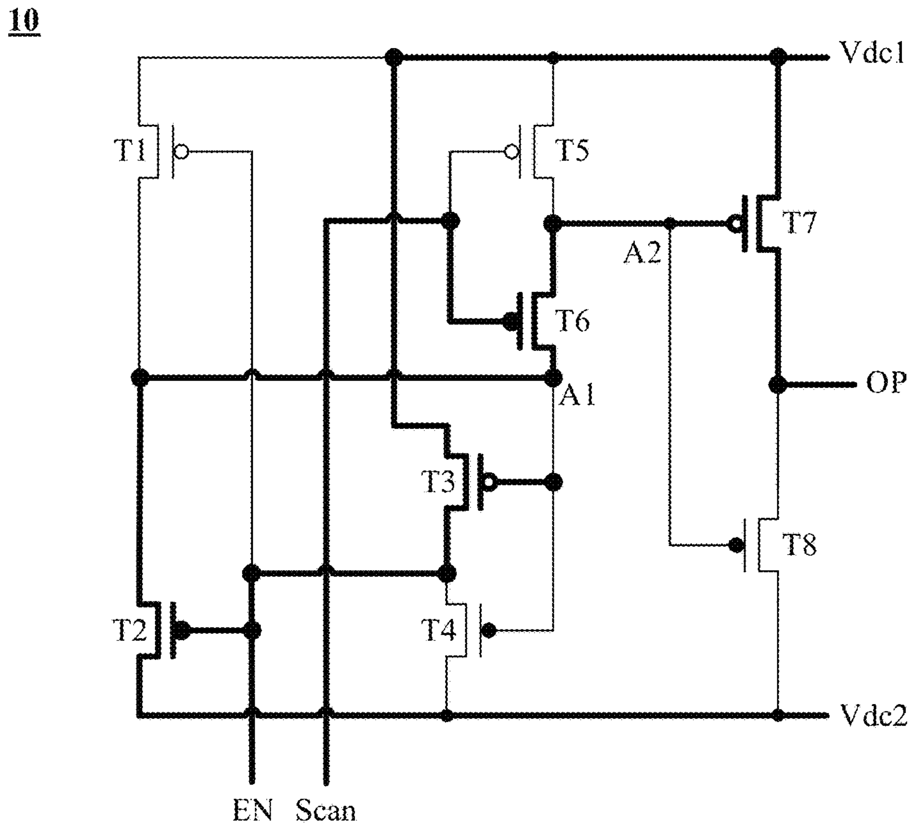
FIG. 23 shows a fourth operating mode of the scanning control circuit in one or more embodiments of FIG. 19.

FIG. 23 shows a fourth operating mode of the scanning control circuit 10 in an embodiment of FIG. 19. As illustrated in FIG. 23, in a case where the level state of the enable control signal EN is the high-level state, the first N-type transistor T2 conducts, thereby pulling the level state of the first node signal to the low-level state of the second voltage terminal Vdc2. In a case where the level state of the initial scanning signal Scan is the high-level state, the third N-type transistor T6 conducts, thereby pulling the level state of the second node signal to the low-level state of the first node signal. The low-level state of the second node signal causes the fourth P-type transistor T7 to conduct, thereby pulling the target scanning signal OP to the high-level state of the first voltage terminal Vdc1.

Figure 24:
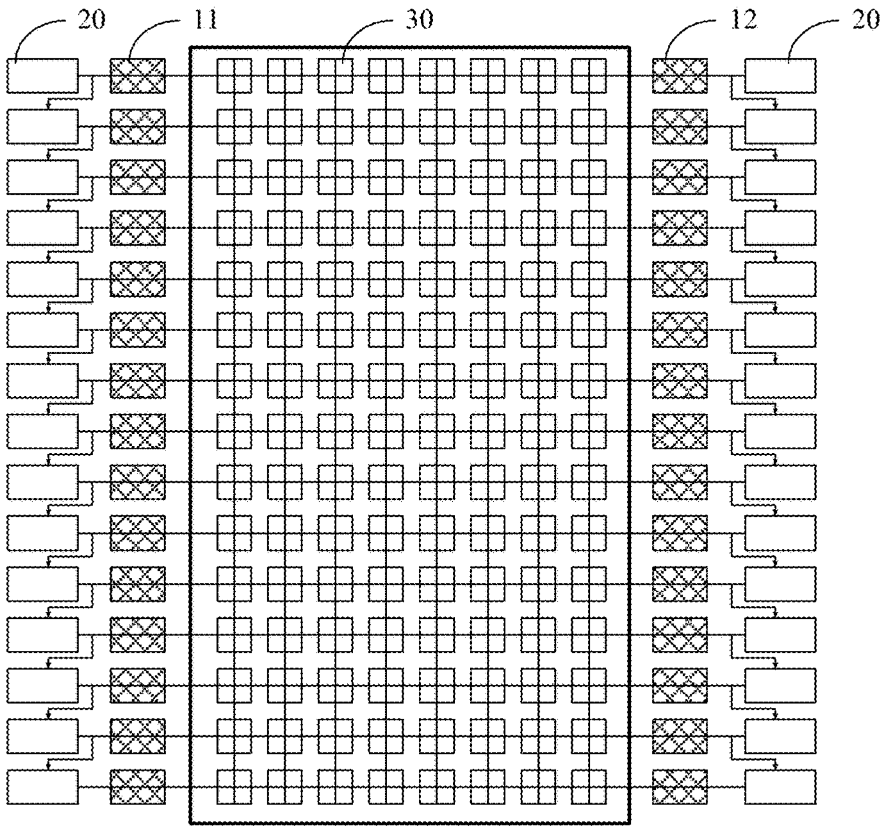
FIG. 24 is a structural schematic diagram of a display module in one or more embodiments.

The embodiments of the present disclosure further provide a display module. FIG. 24 is a structural schematic diagram of a display module in an embodiment. As illustrated in FIG. 24, the display module includes multiple first scanning control circuits 11, multiple gate driving modules 20, and multiple pixel circuits 30. The gate driving module 20 is configured to generate the first initial scanning signal Scan that is configured for controlling the first target transistor. The first scanning control circuit 11 includes the scanning control circuit 10 as described above, and the first scanning control circuit 11 is configured to output a first target scanning signal OP to the connected first target transistor based on the first enable control signal EN and the first initial scanning signal Scan. The pixel circuit 30 includes at least one first target transistor, and at least some of the first target transistors in the pixel circuit 30 are connected to the scanning control circuit 10. In the present embodiment, based on the scanning control circuit 10, the display module may perform local refreshing when needed, thereby reducing the power consumption of the display module.

As illustrated in FIG. 24, in one embodiment, the number of the scanning control circuits 10 is multiple, and multiple pixel circuits 30 are arranged in an array with multiple rows. The multiple pixel circuits 30 located in the same row are connected to the same first scanning control circuit 11. The first target transistors in the multiple pixel circuits 30 connected to the first scanning control circuit 11 have the same function, or may be understood as conducting in the same stage among multiple stages during pixel refresh. The multiple stages include, but are not limited to, an anode reset stage, a gate reset stage, a threshold compensation stage, a data writing stage, etc. In the present embodiment, the row-by-row local refresh may be achieved through the above setting mode.

In one embodiment, the type of the first target transistor is P-type, and the first target transistor connected to the scanning control circuit 10 in the pixel circuit 30 is configured to conduct during the data writing stage of the pixel circuit 30. By connecting the first target transistor that is configured to conduct during the data writing stage, it is possible to prevent the data of a new frame from being written into the pixel circuit 30, thereby maintaining the data of the previous frame. In some embodiments, the first target transistor that is configured to conduct during the data writing stage of the pixel circuit 30 is the transistor T4 in the embodiments of FIGS. 1 and 2. The scanning control circuit 10 is not limited to the transistor T4, but may also be the first target transistor that conducts in other stages.

In one embodiment, the type of the first target transistor is N-type, and the first target transistor connected to the scanning control circuit 10 in the pixel circuit 30 is configured to conduct during the gate reset stage or the threshold compensation stage of the pixel circuit 30. By connecting the first target transistor that is configured to conduct during the gate reset stage or the threshold compensation stage, the written data may not be reset or may not be re-compensated, thereby maintaining the data of the previous frame. In some embodiments, the first target transistor that is configured to conduct in the gate reset stage of the pixel circuit 30 is the transistor T1 in the embodiments of FIGS. 1 and 2, and the first target transistor that is configured to conduct in the threshold compensation stage of the pixel circuit 30 is the transistor T2 in the embodiments of FIGS. 1 and 2. The scanning control circuit 10 is not limited to transistors T1 and T2, but may also be the first target transistor that conducts in other stages.

As illustrated in FIG. 24, in one embodiment, the gate driving module 20 is also configured to generate a second initial scanning signal Scan' that is configured for controlling a second target transistor. The type of the second target transistor is different from the type of the first target transistor. In some embodiments, as above mentioned, the gate driving module 20 may include multiple sets of GOA circuits, some of which generate the first initial scanning signal Scan that is configured for controlling the first target transistor, while others generate the second initial scanning signal Scan' that is configured for controlling the second target transistor. These two portions of the GOA circuits may be respectively set on two sides of the AA area that is configured to be provided with the pixel circuit 30. The display module also includes the second scanning control circuit 12, and the second scanning control circuit 12 is connected to at least one second target transistor in the pixel circuit 30 and the gate driving module 20, respectively. The second scanning control circuit 12 is configured to respectively receive a second enable control signal EN' and the second initial scanning signal Scan', and output a second target scanning signal OP' to the connected second target transistor based on the second enable control signal EN' and the second initial scanning signal Scan'. In a case where the second enable control signal EN' is in the second level state, the level state of the second target scanning signal OP' is the same as that of the second initial scanning signal Scan'. In a case where the second enable control signal EN' is in the first level state, the level state of the second target scanning signal OP' is different from the target level state.

In some embodiments, in a case where the type of the first target transistor is N-type, the type of the second target transistor is P-type. In a case where the second enable control signal EN' is in the low-level state, the level state of the second target scanning signal OP' is the same as that of the second initial scanning signal Scan'. In a case where the second enable control signal EN' is in the high-level state, the level state of the second target scanning signal OP' is the high-level state. In a case where the type of the first target transistor is P-type, the type of the second target transistor is N-type. In a case where the second enable control signal EN' is in the high-level state, the level state of the second target scanning signal OP' is the same as that of the second initial scanning signal Scan'. In a case where the second enable control signal EN' is in the low-level state, the level state of the second target scanning signal OP' is the low-level state.

Figure 25:
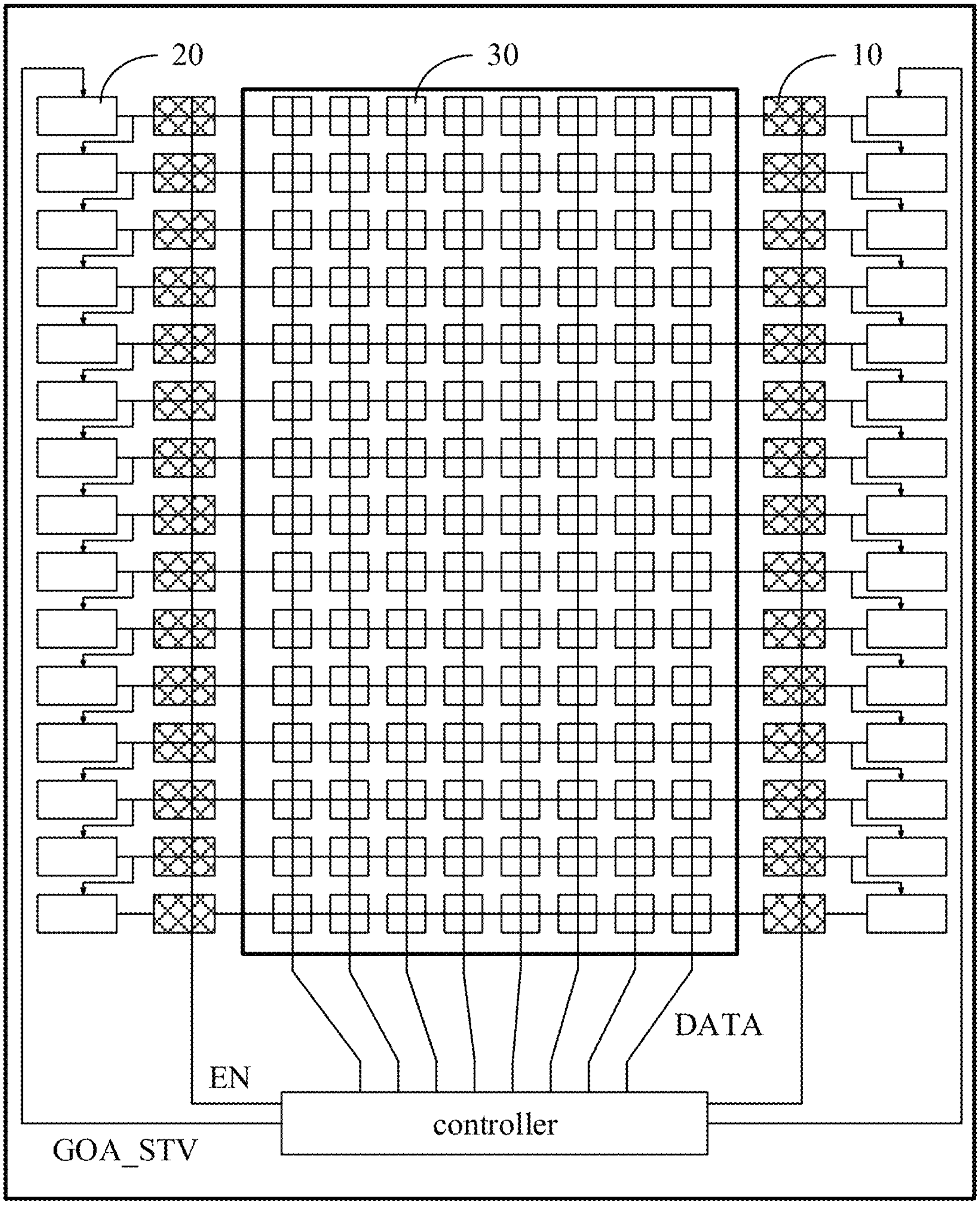
FIG. 25 is a structural schematic diagram of a display device in one or more embodiments.

In the present embodiment, by setting the second scanning control circuit 12, the first scanning control circuit 11 and the second scanning control circuit 12 may operate together, so as to control the pixel circuit 30 that includes both the first target transistor and the second target transistor, such as controlling the LTPO type pixel circuit 30, thereby supporting local refresh of the pixel circuit 30 with more complex types. The present embodiment also provides a display device, and FIG. 25 is a structural schematic diagram of a display device in an embodiment. As illustrated in FIG. 25, the display device includes a controller and the display module as described above. The controller is respectively connected to the gate driving module 20 and the first scanning control circuit 11 of the display module, and configured for driving the gate driving module 20 to generate the first initial scanning signal Scan and generate the first enable control signal EN. Based on the display module in above embodiments, the display device in the present embodiment may perform flexible local refreshing, thereby reducing the power consumption during refreshing.

In one embodiment, in a case where the display module further includes the second scanning control circuit 12, the controller is also connected to the second scanning control circuit 12 and configured for driving the gate driving module 20 to generate the second initial scanning signal Scan' and generate the second enable control signal EN'. The first enable control signal EN and the second enable control signal EN' may be mutually inverted signals.

In one embodiment, the controller is configured to obtain the image to be displayed, determine the refresh area and a non-refresh area based on the image to be displayed, output the first enable control signal with the first level state to the first scanning control circuit 11 that is connected to the pixels in the refresh area, and output the first enable control signal with the second level state to the first scanning control circuit 11 that is connected to the pixels in the non-refresh area. In some embodiments, the image to be displayed in the next frame may be compared with the image being displayed in the current frame. In a case where the data of the pixel circuits 30 of some rows remains unchanged, it is possible to refresh only the data of the pixel circuits 30 of the rows where the data has changed, thereby reducing the power consumption of the display screen.

In one embodiment, the controller may be the display driver chip or the application processor.

In above-mentioned scanning control circuit, the display module, and the display device, the scanning control circuit is disposed between the gate driving module and the pixel circuit. The scanning control circuit may generate a target scanning signal that is able to drive a first target transistor to be periodically in the on or off state based on the initial scanning signal, only in a case where it receives the enable control signal with a first level state. This allows the pixel circuit that receives the target scanning signal to refresh. Moreover, in a case where the scanning control circuit receives the enable control signal with a second level state, the scanning control circuit may generate a target scanning signal that remains in the target level state, so as to control the connected first target transistor to remain in an off state, thereby avoiding data refresh in the corresponding pixel circuit and maintaining the data of the previous frame. Based on the above structure, the scanning control circuit may control the signal base on the initial scanning signal generated by the gate driving module, thereby achieving local refresh for a display screen with multiple pixel circuits.

The technical features of the above embodiments may be arbitrarily combined. In order to simplify the description, all possible combinations of the technical features in the above embodiments are not described. However, as long as the combinations of the technical features do not contradict, the combinations of the technical features should be considered to be within the scope of the description.

The above embodiments only express several implementation modes of the embodiments of the present disclosure, and the descriptions thereof are more specific and detailed, but cannot be understood as limiting the scope of the disclosure. For those of ordinary skill in the art, several modifications and improvements may be made without departing from the concept of the embodiments of the present disclosure, all of which fall in the protection scope of the embodiments of the present disclosure. Therefore, the protection scope of the present disclosure should be subject to the contents of the claims.

The invention claimed is:

1. A scanning control circuit, wherein the scanning control circuit is configured to be connected to a gate driving module and be connected to at least one first target transistor in a pixel circuit; the scanning control circuit is configured to respectively receive an enable control signal and an initial scanning signal from the gate driving module, and output a target scanning signal to the connected first target transistor based on the enable control signal and the initial scanning signal;

in a case where the enable control signal is in a first level state, a level state of the target scanning signal is the same as that of the initial scanning signal;

in a case where the enable control signal is in a second level state, the level state of the target scanning signal is a target level state; and the first level state is different from the second level state, and the target level state is a level state that causes the first target transistor to be in an off state;

wherein the scanning control circuit comprises:

a first switch module, configured to receive the enable control signal and generate a first node signal based on the enable control signal, wherein a level state of the first node signal is different from that of the enable control signal; and a second switch module, connected to the first switch module, wherein the second switch module is configured to be connected to the gate driving module and configured to generate the target scanning signal based on the initial scanning signal and the first node signal;

wherein the first switch module comprises:

a first P-type transistor, wherein a first terminal of the first P-type transistor is configured to be connected to a first voltage terminal, the first voltage terminal is configured to transmit a signal with a high-level state, and a gate of the first P-type transistor is configured to receive the enable control signal; and a first N-type transistor, wherein a first terminal of the first N-type transistor is connected to a second terminal of the first P-type transistor, a second terminal of the first N-type transistor is configured to be connected to a second voltage terminal, the second voltage terminal is configured to transmit a signal with a low-level state, and a gate of the first N-type transistor is configured to receive the enable control signal;

wherein a connection node between the first P-type transistor and the first N-type transistor is a first node that is configured for outputting the first node signal.

2. The scanning control circuit according to claim 1, wherein the first switch module further comprises:

a second P-type transistor, wherein a first terminal of the second P-type transistor is configured be connected to the first voltage terminal, and a gate of the second P-type transistor is connected to the first node; and a second N-type transistor, wherein a first terminal of the second N-type transistor is connected to a second terminal of the second P-type transistor, a second terminal of the second N-type transistor is configured to be connected to the second voltage terminal, and a gate of the second N-type transistor is connected to the first node.

3. The scanning control circuit according to claim 1, wherein a type of the first target transistor is P-type, and the target level state is a high-level state; and the second switch module is configured to generate the target scanning signal with the low-level state in a case where the level state of the first node signal is the high-level state and a level state of the initial scanning signal is the low-level state, and otherwise, generate the target scanning signal with the high-level state.

4. The scanning control circuit according to claim 3, wherein the second switch module comprises:

a first switch unit, connected to the first switch module and configured to be connected to the gate driving module; wherein the first switch unit is configured to generate a second node signal with the low-level state in a case where the level state of the initial scanning signal is the high-level state; and the first switch unit is configured to generate the second node signal with the same level state as the first node signal in a case where the level state of the initial scanning signal is the low-level state; and a second switch unit, connected to the first switch unit and configured to generate the target scanning signal based on the second node signal, wherein a level state of the second node signal is opposite to that of the target scanning signal.

5. The scanning control circuit according to claim 4, wherein the first switch unit comprises:

a third P-type transistor, wherein a first terminal of the third P-type transistor is connected to the first node, and a gate of the third P-type transistor is configured to receive the initial scanning signal; and a third N-type transistor, wherein a first terminal of the third N-type transistor is connected to a second terminal of the third P-type transistor, a second terminal of the third N-type transistor is configured to be connected to the second voltage terminal, and a gate of the third N-type transistor is configured to receive the initial scanning signal;

wherein a connection node between the third P-type transistor and the third N-type transistor is the second node that is configured for outputting the second node signal.

6. The scanning control circuit according to claim 4, wherein the second switch unit comprises:

a fourth P-type transistor, wherein a first terminal of the fourth P-type transistor is configured to be connected to the first voltage terminal, and a gate of the fourth P-type transistor is connected to the first switch unit; and a fourth N-type transistor, wherein a first terminal of the fourth N-type transistor is connected to a second terminal of the fourth P-type transistor, a second terminal of the fourth N-type transistor is configured to be connected to the second voltage terminal, and a gate of the fourth N-type transistor is connected to the first switch unit;

wherein a connection node between the fourth P-type transistor and the fourth N-type transistor is configured to output the target scanning signal.

7. The scanning control circuit according to claim 1, wherein a type of the first target transistor is N-type, and the target level state is a low-level state;

the second switch module is configured to generate the target scanning signal with the high-level state in a case where the level state of the first node signal is the low-level state and a level state of the initial scanning signal is the high-level state, and otherwise, generate the target scanning signal with the low-level state.

8. The scanning control circuit according to claim 7, wherein the second switch module comprises:

a first switch unit, connected to the first switch module and configured to be connected to the gate driving module; wherein the first switch unit is configured to generate a second node signal with the high-level state in a case where level state of the initial scanning signal is the low-level state; and the first switch unit is configured to generate the second node signal with the same level state as the first node signal in a case where the level state of the initial scanning signal is the high-level state; and a second switch unit, connected to the first switch unit and configured to generate the target scanning signal based on the second node signal, wherein a level state of the second node signal is opposite to that of the target scanning signal.

9. The scanning control circuit according to claim 8, wherein the first switch unit comprises:

a third P-type transistor, wherein a first terminal of the third P-type transistor is configured to be connected to the first voltage terminal, and a gate of the third P-type transistor is configured to receive the initial scanning signal; and a third N-type transistor, wherein a first terminal of the third N-type transistor is connected to a second terminal of the third P-type transistor, a second terminal of the third N-type transistor is connected to the first node, and a gate of the third N-type transistor is configured to receive the initial scanning signal;

wherein a connection node between the third P-type transistor and the third N-type transistor is the second node that is configured for outputting the second node signal.

10. The scanning control circuit according to claim 8, wherein the second switch unit comprises:

a fourth P-type transistor, wherein a first terminal of the fourth P-type transistor is configured to be connected to the first voltage terminal, and a gate of the fourth P-type transistor is connected to the first switch unit; and a fourth N-type transistor, wherein a first terminal of the fourth N-type transistor is connected to a second terminal of the fourth P-type transistor, a second terminal of the fourth N-type transistor is configured to be connected to the second voltage terminal, and a gate of the fourth N-type transistor is connected to the first switch unit;

wherein a connection node between the fourth P-type transistor and the fourth N-type transistor is configured to output the target scanning signal.

11. A display module, comprising:

a gate driving module, configured for generating a first initial scanning signal that is configured for controlling a first target transistor;

a first scanning control circuit, comprising a scanning control circuit, and configured for outputting a first target scanning signal to the connected first target transistor based on a first enable control signal and the first initial scanning signal; wherein the scanning control circuit is configured to be connected to a gate driving module and be connected to at least one first target transistor in a pixel circuit; the scanning control circuit is configured to respectively receive an enable control signal and an initial scanning signal from the gate driving module, and output a target scanning signal to the connected first target transistor based on the enable control signal and the initial scanning signal;

in a case where the enable control signal is in a first level state, a level state of the target scanning signal is the same as that of the initial scanning signal; in a case where the enable control signal is in a second level state, the level state of the target scanning signal is a target level state; and the first level state is different from the second level state, and the target level state is a level state that causes the first target transistor to be in an off state; and a plurality of pixel circuits, wherein each of the plurality of pixel circuit comprises at least one first target transistor, and at least some first target transistors in the plurality of pixel circuits are connected to the scanning control circuit;

wherein the scanning control circuit comprises:

a first switch module, configured to receive the enable control signal and generate a first node signal based on the enable control signal, wherein a level state of the first node signal is different from that of the enable control signal; and a second switch module, connected to the first switch module, wherein the second switch module is configured to be connected to the gate driving module and configured to generate the target scanning signal based on the initial scanning signal and the first node signal;

wherein the first switch module comprises;

a first P-type transistor, wherein a first terminal of the first P-type transistor is configured to be connected to a first voltage terminal, the first voltage terminal is configured to transmit a signal with a high-level state and a gate of the first P-type transistor is configured to receive the enable control signal; and a first N-type transistor, wherein a first terminal of the first N-type transistor is connected to a second terminal of the first P-type transistor, a second terminal of the first N-type transistor is configured to be connected to a second voltage terminal, the second voltage terminal is configured to transmit a signal with a low-level state, and a gate of the first N-type transistor is configured to receive the enable control signal:

wherein a connection node between the first P-type transistor and the first N-type transistor is a first node that is configured for outputting the first node signal.

12. The display module according to claim 11, wherein the number of the scanning control circuits is multiple, so that the first scanning control circuit comprises a plurality of scanning control circuits; and the plurality of pixel circuits are arranged in an array with a plurality of rows, and the plurality of pixel circuits located in the same row are connected to the same first scanning control circuit.

13. The display module according to claim 11, wherein a type of the first target transistor is P-type, and the first target transistor connected to the scanning control circuit in the plurality of pixel circuits is configured to conduct during a data writing stage of the plurality of pixel circuits.

14. The display module according to claim 11, wherein a type of the first target transistor is N-type, and the first target transistor connected to the scanning control circuit in the plurality of pixel circuits is configured to conduct during a gate reset stage or a threshold compensation stage of the plurality of pixel circuits.

15. The display module according to claim 11, wherein the gate driving module is further configured to generate a second initial scanning signal that is configured for controlling a second target transistor, a type of the second target transistor is different from that of the first target transistor, and the display module further comprises:

a second scanning control circuit, connected to the gate driving module and at least one second target transistor in the plurality of pixel circuits, respectively; the second scanning control circuit is configured to respectively receive a second enable control signal and the second initial scanning signal, and output a second target scanning signal to the connected second target transistor based on the second enable control signal and the second initial scanning signal;

wherein in a case where the second enable control signal is in a second level state, a level state of the second target scanning signal is the same as that of the second initial scanning signal; in a case where the second enable control signal is in a first level state, the level state of the second target scanning signal is different from a target level state.

16. A display device, comprising:

a display module, comprising:

a gate driving module, configured for generating a first initial scanning signal that is configured for controlling a first target transistor;

a first scanning control circuit, comprising a scanning control circuit, and configured for outputting a first target scanning signal to the connected first target transistor based on a first enable control signal and the first initial scanning signal; wherein the scanning control circuit is configured to be connected to a gate driving module and be connected to at least one first target transistor in a pixel circuit; the scanning control circuit is configured to respectively receive an enable control signal and an initial scanning signal from the gate driving module, and output a target scanning signal to the connected first target transistor based on the enable control signal and the initial scanning signal;

in a case where the enable control signal is in a first level state, a level state of the target scanning signal is the same as that of the initial scanning signal; in a case where the enable control signal is in a second level state, the level state of the target scanning signal is a target level state; and the first level state is different from the second level state, and the target level state is a level state that causes the first target transistor to be in an off state; and a plurality of pixel circuits, wherein each of the plurality of pixel circuit comprises at least one first target transistor, and at least some first target transistors in the plurality of pixel circuits are connected to the scanning control circuit; and a controller, respectively connected to the gate driving module and the first scanning control circuit of the display module, wherein the controller is configured to drive the gate driving module to generate the first initial scanning signal and generate the first enable control signal;

wherein the scanning control circuit comprises:

a first switch module, configured to receive the enable control signal and generate a first node signal based on the enable control signal, wherein a level state of the first node signal is different from that of the enable control signal; and a second switch module, connected to the first switch module, wherein the second switch module is configured to be connected to the gate driving module and configured to generate the target scanning signal based on the initial scanning signal and the first node signal;

wherein the first switch module comprises:

a first P-type transistor, wherein a first terminal of the first P-type transistor is configured to be connected to a first voltage terminal, the first voltage terminal is configured to transmit a signal with a high-level state, and a gate of the first P-type transistor is configured to receive the enable control signal; and a first N-type transistor, wherein a first terminal of the first N-type transistor is connected to a second terminal of the first P-type transistor a second terminal of the first N-type transistor is configured to be connected to a second voltage terminal, the second voltage terminal is configured to transmit a signal with a low-level state, and a gate of the first N-type transistor is configured to receive the enable control signal;

wherein a connection node between the first P-type transistor and the first N-type transistor is a first node that is configured for outputting the first node signal.

17. The display device according to claim 16, wherein the controller is configured to obtain an image to be displayed, determine a refresh area and a non-refresh area based on the image to be displayed, output the first enable control signal with a first level state to the first scanning control circuit that is connected to pixels in the refresh area, and output the first enable control signal with a second level state to the first scanning control circuit that is connected to pixels in the non-refresh area.

18. The display device according to claim 16, wherein the controller is a display driver chip or an application processor.

* * * * *